US012084343B1

(12) United States Patent
Hitch et al.

(10) Patent No.: US 12,084,343 B1
(45) Date of Patent: Sep. 10, 2024

(54) TRANSIENT N₂O DECOMPOSITION PROCESS AND REACTOR

(71) Applicant: Reaction Systems, Inc., Golden, CO (US)

(72) Inventors: Bradley Dean Hitch, Golden, CO (US); Jeffrey Robert Engel, Golden, CO (US); David Thomas Wickham, Golden, CO (US)

(73) Assignee: Reaction Systems, Inc., Golden, CO (US)

( * ) Notice: Subject to any disclaimer, the term of this patent is extended or adjusted under 35 U.S.C. 154(b) by 411 days.

(21) Appl. No.: 17/667,308

(22) Filed: Feb. 8, 2022

Related U.S. Application Data

(63) Continuation of application No. 16/541,024, filed on Aug. 14, 2019, now abandoned.

(60) Provisional application No. 62/718,641, filed on Aug. 14, 2018.

(51) Int. Cl.
C01B 13/02 (2006.01)
B01J 7/00 (2006.01)
B01J 21/08 (2006.01)
B01J 23/06 (2006.01)
B01J 23/46 (2006.01)
C01B 21/22 (2006.01)

(52) U.S. Cl.
CPC .............. *C01B 13/0203* (2013.01); *B01J 7/00* (2013.01); *B01J 21/08* (2013.01); *B01J 23/06* (2013.01); *B01J 23/464* (2013.01); *C01B 21/22* (2013.01)

(58) Field of Classification Search
CPC ........ C01B 13/0203; C01B 21/22; B01J 7/00; B01J 21/08; B01J 23/06
See application file for complete search history.

(56) References Cited

U.S. PATENT DOCUMENTS

| | | |
|---|---|---|
| 1,408,987 A | 3/1922 | Casale |
| 1,478,550 A | 12/1923 | Casale |
| 2,029,604 A | 2/1936 | Bayer et al. |
| 3,351,562 A | 11/1967 | Taylor |
| 3,649,135 A | 3/1972 | Marsh et al. |
| 4,002,421 A | 1/1977 | Summer |
| 4,127,389 A | 11/1978 | Hackemesser et al. |
| 4,352,782 A | 10/1982 | Daly |
| 4,750,986 A | 6/1988 | Pinto |
| 4,810,472 A | 3/1989 | Andrew et al. |
| 4,822,521 A | 4/1989 | Fuderer |
| 5,072,581 A | 12/1991 | Harshman |
| 5,171,553 A | 12/1992 | Li et al. |
| 5,223,651 A | 6/1993 | Stickler et al. |
| 5,300,275 A | 4/1994 | Lywood |
| 5,314,673 A | 5/1994 | Anseth et al. |
| 5,582,806 A | 12/1996 | Skanberg et al. |
| 5,727,382 A | 3/1998 | Chevalier et al. |
| 6,109,018 A | 8/2000 | Rostrup-Nielsen et al. |
| 6,159,358 A | 12/2000 | Mulvaney, III et al. |
| 6,347,627 B1 | 2/2002 | Frankie et al. |
| 6,779,335 B2 | 8/2004 | Herdy et al. |
| 6,883,330 B2 | 4/2005 | Guinan et al. |
| 7,165,546 B2 | 1/2007 | Frankie et al. |
| 7,509,795 B2 | 3/2009 | Allen |
| 7,571,598 B2 | 8/2009 | O'Brien et al. |
| 8,652,402 B2 | 2/2014 | Zubrin et al. |
| 8,863,495 B2 | 10/2014 | Ikeda |
| 9,101,898 B2 | 8/2015 | Zubrin et al. |
| 9,283,530 B2 | 3/2016 | Zubrin et al. |
| 9,745,912 B2 | 8/2017 | Van den Bergh |
| 11,111,448 B1 | 9/2021 | Hitch et al. |
| 2007/0175222 A1 | 8/2007 | Donohue et al. |
| 2009/0133788 A1 | 5/2009 | Mungas et al. |
| 2016/0377028 A1 | 12/2016 | Wickham et al. |
| 2018/0223769 A1 | 8/2018 | Wickham et al. |

OTHER PUBLICATIONS

U.S. Appl. No. 14/272,273, filed May 7, 2014.
U.S. Appl. No. 15/587,643, filed May 5, 2017.
U.S. Appl. No. 16/447,913, filed Jun. 20, 2019.
U.S. Appl. No. 16/541,024, filed Aug. 14, 2019.
Ben-Yakar et al. (2001) "Cavity Flame-Holders for Ignition and Flame Stabilization in Scramjets: An Overview," Journal of Propulsion and Power, vol. 17, No. 4, pp. 869-877.
Billingsley et al. (2006) "Plasma Torch Atomizer-Igniter for Supersonic Combustion of Liquid Hydrocarbon Fuels," Paper No. AIAA 2006-7970, 14th AIAA/AHI Space Planes and Hypersonic Systems and Technologies Conference, Canberra, Australia.
Bonebrake et al. (2019) "The effect of nanosecond pulsed high frequency discharges on the temperature evolution of ignition kernels," Proceedings of the Combustion Institute, vol. 37, Issue 4, pp. 5561-5568, available online Jun. 30, 2018.
Carter (2012) "Supersonic Combustion Ramjet Research," Air Force Research Laboratory, AFRL-RQ-WP-TR-2012-0247, 54 pp.
Cuppoletti et al. (2019) "Energy Coupling Mechanism for Pulse Detonation Ignition of a Scramjet Cavity," Proceedings of the Combustion Institute, 37, pp. 3453-3460, available online Sep. 3, 2018.

(Continued)

Primary Examiner — Sikarl A Witherspoon
(74) Attorney, Agent, or Firm — Leydig, Voit & Mayer, Ltd.

(57) ABSTRACT

A N₂O decomposition reactor and a method of its use to produce an effluent suitable for use in an ignition device or in the main fuel injection system in high speed aircraft. N₂O decomposition is an exothermic reaction and produces a high temperature product containing high concentrations of O₂. Combination of fuel with this effluent ignites quickly and is an effective ignition source for the aircraft combustor. Reactor performance is adjusted to meet the conditions required for a selected application by changing the relative concentrations of CO₂ and N₂O, modifying the reactor length, and varying the quantity of catalyst in the reactor. For use in a pilot ignition device, the desired effluent temperature is between 500° C. and 1200° C. in order to ignite and combust the fuel within the design residence time, between 0.5 and 10 ms. For application as a barbotage gas generator in a fuel injection system, the temperature of the effluent can range from 300° C. up to 800° C. and it is desirable that the effluent temperature remains within this range for periods of up to two minutes.

20 Claims, 15 Drawing Sheets

(56) References Cited

OTHER PUBLICATIONS

Herdy (Aug. 2006) "Nitrous Oxide I Hydrocarbon Fuel Advanced Chemical Propulsion: DARPA Contract Overview," Thermal & Fluids Analysis Workshop (TFAWS 2006), University of Maryland. pp. 1-26.

Hitch et al. (2010) "Design of a Catalytic Nitrous Oxide Decomposition Reactor," Paper No. AIAA 2010-7129, 46th AIAA/ASME/SAE/ASEE Joint Propulsion Conference & Exhibit, Jul. 25-28, 2010, Nashville, TN, 10 pp.

Jacobsen et al. (2006) "Starting and Operation of a Streamline-Traced Busemann Inlet at Mach 4," Paper No. AIAA-2006-4505, 42nd AIAA/ASME/SAE/ASEE Joint Propulsion Conference & Exhibit Sacramento, California.

Jacobsen et al. (2008) "Plasma-Assisted Ignition in Scramjets," Journal of Propulsion and Power. 24:641-654.

Mathur et al. (2000) "Liquid JP-7 Combustion in a Scramjet Combustor," Paper No. AIAA-2000-3581, 36th AIAA/ASME/SAE/ASEE Joint Propulsion Conference and Exhibit Las Vegas, NV, USA.

Morrisette et al. (1978) "Turbulent-Flow Separation Criteria for Overexpanded Supersonic Nozzles," NASA Technical Paper 1207, 42 pp.

Niwa et al. (2000) "Development of a Resonance Igniter for G02/Kerosene Ignition," Paper No. A00-36535, 36th AIAA/ASME/SAE/ASEE Joint Propulsion Conference, Huntsville AL.

Norris (2001) "Freejet Test of the AFRL HySET Scram jet Engine Model at Mach 6.5 and 4.5," Paper No. AIAA 2001-3196, 37th Joint Propulsion Conference and Exhibit Salt Lake City, UT, USA.

Wickham et al. (2010) "Development and Testing of a High Temperature N2O Decomposition Catalyst," Paper No. AIAA 2010-7128, 46th AIAA/ASME/SAE/ASEE Joint Propulsion Conference & Exhibit, Nashville, TN.

Yu et al. (2001) "Investigation of Kerosene Combustion Characteristics with Pilot Hydrogen in Model Supersonic Combustors," J. Prop. Power. 17(6):1263-1272.

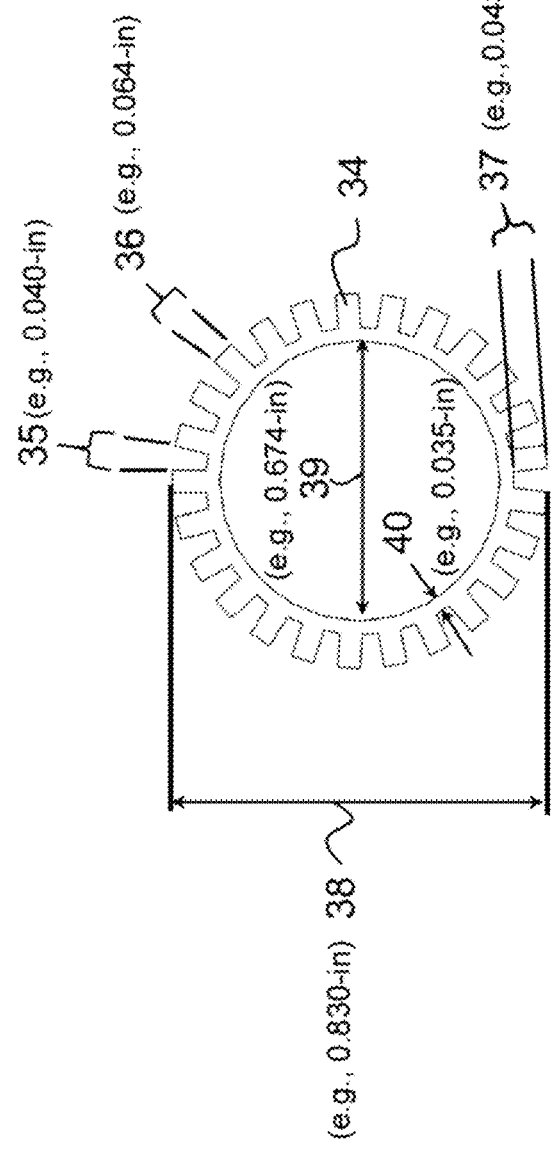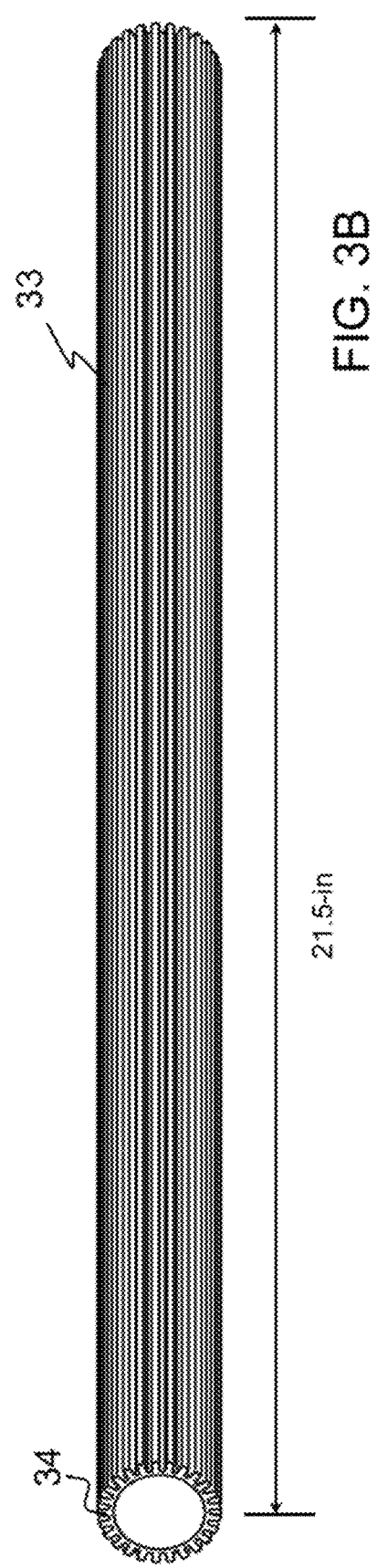

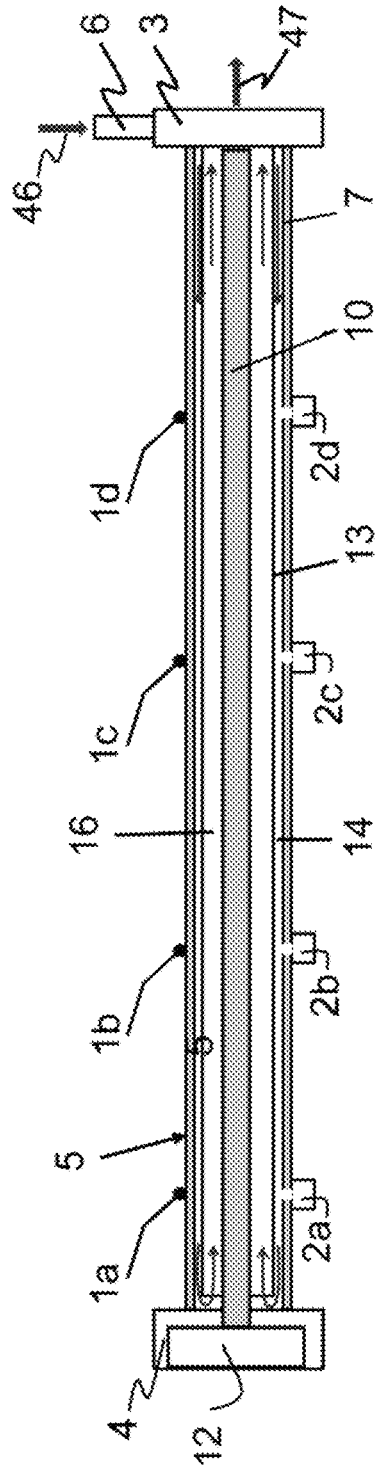
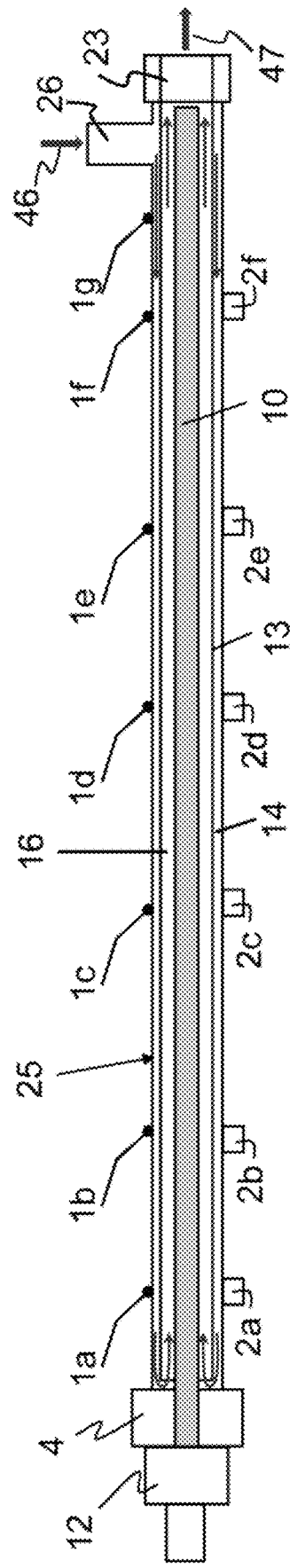
FIG. 4A
FIG. 4B

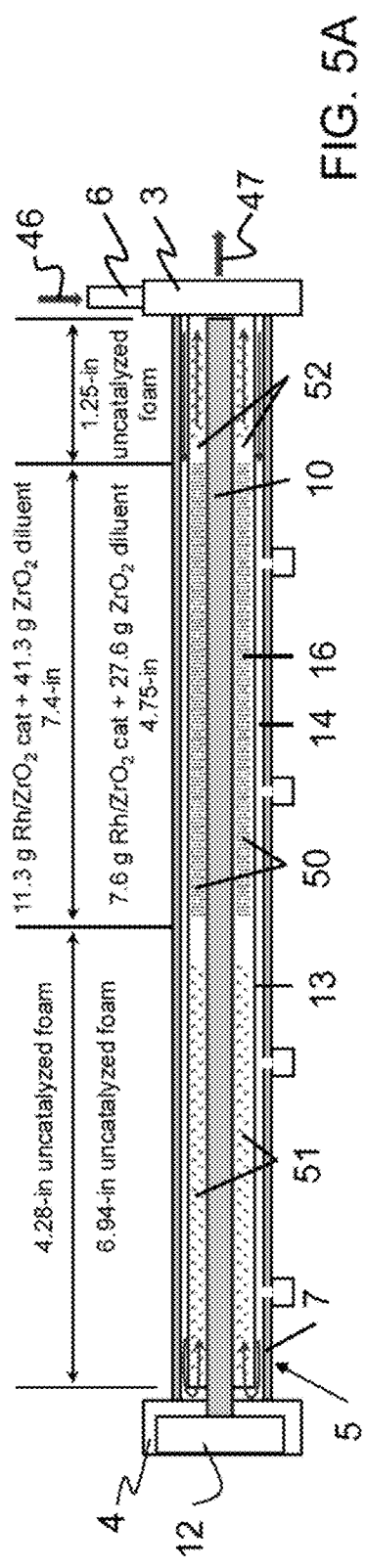
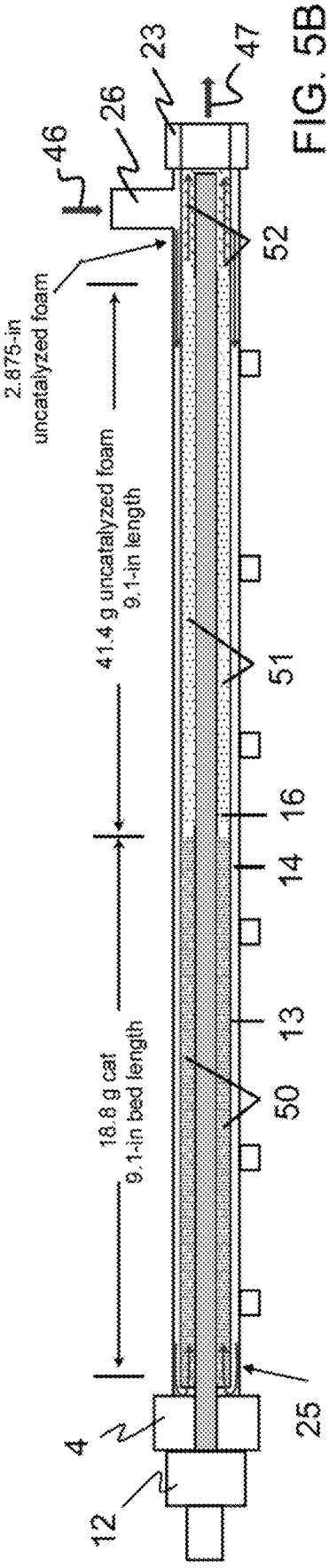
FIG. 5A
FIG. 5B

TRANSIENT N₂O DECOMPOSITION PROCESS AND REACTOR

CROSS-REFERENCE TO RELATED APPLICATIONS

This application is a continuation of U.S. patent application Ser. No. 16/541,024 filed Aug. 14, 2019, and claims the benefit of and priority to U.S. provisional application 62/718,641, filed Aug. 14, 2018, each of which applications is incorporated by reference herein in its entirety.

STATEMENT REGARDING FEDERALLY SPONSORED RESEARCH OR DEVELOPMENT

This invention was made with U.S. Government funding through the United States Air Force under contracts FA8650-09-M-2956, FA8650-10-C-2097 and FA8650-14-C-2441. The government has certain rights in this invention.

BACKGROUND OF INVENTION

This invention generally relates to a catalytic heat exchanger reactor for $N_2O$ decomposition that can be used, for example, for main fuel barbotage or in a pilot ignition torch for high speed aircraft (scramjets). Scramjets require methods to ignite a kerosene fueled combustor after a booster has accelerated the vehicle to supersonic speeds. Methods are also needed to improve fuel atomization so that combustion can occur in the very short residence times that are typical of these vehicles.

$N_2O$ decomposition is an exothermic reaction that produces a mixture containing up to 33% $O_2$ at high temperatures. This product mixture can be used as a source of oxygen, for example, in scramjets to ignite a pilot ignition torch or it can be mixed with the main fuel to improve fuel atomization. The advantage of $N_2O$ in the barbotage application is that it can be carried on board the vehicle as a liquid and therefore it can be contained in a tank that is smaller and lighter than one that would be needed to carry an equivalent amount of air. The $N_2O$ decomposition reactor is designed to use heat liberated by the reaction to convert the liquid feed into the gaseous state and preheat the reactants to the temperature required for the decomposition catalyst to be active.

Reactors that use some of the heat generated by the exothermic reaction to provide energy to preheat the reactants have been previously reported. Likewise, reactors and catalyst for $N_2O$ decomposition have been previously reported. However, the reactor and methods of this disclosure are significantly improved over those described in the prior art.

Reactors that use the heat produced by an exothermic reaction to preheat the incoming feed mixture are well known in the art. For example, U.S. Pat. Nos. 1,408,987 and 1,478,550 report reactors that use the heat produced by the formation of ammonia to preheat the incoming feed flow of $N_2$ and $H_2$. In the first patent, the incoming flow makes a single pass through an outer annulus and then is directed into an inner annulus that contains a catalyst, which promotes the ammonia formation reaction. The two annular pathways are separated only by a thin metal wall and therefore heat produced by the reaction is transferred to the incoming feed mixture. U.S. Pat. No. 1,478,550 reports a more complex flow path where the feed first passes through a passage that extends the length of the reactor that is in direct contact with another passage that contains flow exiting the catalyst bed. The preheated flow then passes through a chamber containing an electric heater, and then into the catalyst bed.

U.S. Pat. No. 2,029,604 reports a reactor for carrying out exothermic catalytic oxidation of sulfur dioxide to sulfur trioxide. While acknowledging the benefit of using the feed gas to cool the catalyst, they report a method by which the temperature can be controlled with improved precision. The reactants are preheated by directing the feed gas through multiple passages that are in contact with other channels that contain effluent from the catalyst. The preheated feed is then flowed through the multiple catalyst beds. The multiple gas streams are combined into one flow, which is reported to equalize the temperature differences between the individual streams. The equalized temperature flow is then divided into multiple streams and used to preheat incoming feed mixture. In addition to reactors that are designed for exothermic reaction where heat is transferred out of the catalyst and into the feed stream, reactors have also been reported for endothermic reactions where heat is transferred into the catalyst bed.

U.S. Pat. No. 6,159,358 reports a process in which the reactants of an endothermic reaction are heated before reaching the catalyst by contact with a heating medium by passing the reactant stream through multiple narrow reaction channels that are in contact with the channels of the heating medium. The heating medium is provided from a separate flow or various combinations of feed and product flows. One example reported is paraffin isomerization where a need exists to hydrogenate benzene to cyclohexane, which is an exothermic reaction. The patent reports that heat generated by this hydrogenation reaction can be can used to indirectly provide energy for the isomerization reaction zone and also preheat the feed that enters the reaction zone.

U.S. Pat. No. 5,300,275 reports a process where the energy needed to drive a hydrocarbon steam reforming reaction for $H_2$ production is driven by combusting a portion of the hydrocarbon feedstock in auxiliary tubes, which are in contact with the catalyst bed in the reforming reactor. U.S. Pat. Nos. 4,810,472; 4,750,986; and 4,822,521 report reactor configurations where the heat from hot gases in the secondary stages drives endothermic processes. U.S. Pat. No. 4,127,389 shows a variety of tube chamber designs for supplying heat to a primary reforming reaction from a secondary reforming reaction zone.

Reactor configurations specifically for $N_2O$ decomposition reaction have been reported. U.S. Pat. No. 4,002,421 reports a reactor designed for the thermal decomposition of $N_2O$ where the incoming liquid flow is introduced through an injector that is surrounded by the hot decomposition products in order to preheat the flow before it is discharged from the nozzle. The injector also directs the incoming $N_2O$ in a direction opposite the flow of the discharge gas and toward the auxiliary heat source.

U.S. Pat. Nos. 6,347,627 and 7,165,546 report a self-contained system for converting $N_2O$ to a breathable gas mixture. The system uses the heat of the reaction to preheat the incoming $N_2O$ flow to a temperature of approximately 150° C. The incoming $N_2O$ flows axially through a tube located in the center of the reactor and then after passing through the length of the reactor the flow is directed into the catalyst bed, which is in the annulus next to inlet flow. A heater is used to raise the temperature of the system to approximately 150° C., which is needed for light off to occur. The patent asserts that a system using $N_2O$ can contain breathable oxygen at four times the density of compressed gas systems at 33% of the pressure. The use of a polymeric membrane that can increase $O_2$ concentration to over 90% is also discussed.

U.S. Pat. Nos. 9,101,898 and 9,283,530 report using $N_2O$ as an energy source in a propulsion system, as a mono- or bipropellant, as a replacement for conventional monopropellants, hydrazine and hydrogen peroxide, which are both toxic and dangerous. The patents report a reactor configuration in which $N_2O$ is preheated by the products of the exothermic $N_2O$ decomposition reaction as described in U.S. Pat. Nos. 6,347,627 and 7,165,546. However, instead of entering the reactor through a single tube in the center of the catalyst bed, the flow is directed through an annulus on the outside of the catalyst bed, which comprises a large volume in the center of the reactor. Distinct from previous reactors, this patent reports a configuration where the residence time in the outer annulus is limited in order to prevent the incoming $N_2O$ from undergoing thermal decomposition before it contacts the catalyst. Generator embodiments in this patent include those reported to enhance the durability of the generator itself, thereby decreasing the rate of generator failure. These patents discuss limiting the size of the preheat chamber to achieve limited residence time, which is significantly different from the larger preheated chambers such as those reported by U.S. Pat. No. 6,159,358.

Catalysts for $N_2O$ decomposition to $N_2$ and $O_2$ are known, for example, U.S. Pat. No. 3,351,562 reports a copper magnesia catalyst for decomposing $N_2O$ into $N_2$ and $O_2$.

U.S. Pat. Nos. 7,165,546 and 6,347,627 report catalysts selected from the group consisting of palladium oxide, iridium oxide, osmium oxide, platinum oxide, vanadium oxide, iron oxide, chromium oxide, titanium oxide, nickel oxide, manganese oxide, lanthanum oxide, samarium oxide cerium oxide, praseodymium oxide, neodymium oxide, europium oxide, terbium oxide, gadolinium oxide, thulium oxide, lutetium oxide, ytterbium oxide, erbium oxide, dysprosium oxide, holmium oxide, aluminum oxide, gallium oxide, indium oxide, thallium oxide, scandium oxide, yttrium oxide, beryllium oxide, magnesium oxide, calcium oxide, strontium oxide and barium oxide, on a support selected from the group consisting of alumina, magnesia, zirconia, yttria, calcium oxide, strontium oxide and gallium oxide. Catalysts therein can also be selected from a group consisting of iron, palladium, platinum, iridium and osmium, ion-exchanged with BETA base Zeolite, MOR base Zeolite, MFI base Zeolite, MEL base Zeolite, MER base Zeolite and mixtures thereof.

In U.S. Pat. Nos. 9,101,898 and 9,283,530, an $N_2O$ decomposition reactor and catalysts selected from the group consisting of rhodium, ruthenium, platinum, copper, iridium, nickel, magnesium oxide and zirconium oxide are reported.

While various reactor geometries for $N_2O$ decomposition have been reported, all describe the use of pure $N_2O$ in the reactor as a feed in a steady state operation. Other disclosures included methods to avoid damage caused by the high temperatures produced in the reaction along with methods to limit gas phase $N_2O$ decomposition in the preheat chamber. For $N_2O$ decomposition reactors, using relatively low flow rates compared to the reactor size, for example less than 0.1 lb/min per lb reactor weight, reduces the heat generation rate and maintains temperatures that are low enough to avoid damage to the catalyst and reactor through internal thermal storage, external heat loss, or a combination of both.

None of the previously described $N_2O$ reactors, however, would be suitable for use on board a high-speed aircraft. For such application, the reactor must be as small as possible and handle high feed flow rates, which results in rapid heating to temperatures that can quickly exceed safe operation limits. The high temperatures generated can cause the metal walls that contain the pressure to lose strength and high temperatures will also cause the catalyst to lose activity.

The reactor configuration of the present disclosure avoids high temperatures and provides a reactor which can operate safely using very high feed flow rates. The operating temperatures of the reactor are controlled in two ways: using a mixture of $CO_2$ and $N_2O$ instead of pure $N_2O$ and limiting the operating time to two minutes or less.

Adding $CO_2$ to the $N_2O$ feed flow could be acceptable in a gas generator application, but would generally not be acceptable to provide thrust as described in U.S. Pat. Nos. 9,101,898 and 9,283,530. Addition of $CO_2$ would reduce the specific impulse (Isp) to values well below those of hydrazine or hydrogen peroxide. The addition of $CO_2$ would also be unacceptable for use in a breathing system as described in U.S. Pat. Nos. 6,347,627 and 7,165,546 because the high levels of $CO_2$ would be toxic.

SUMMARY OF THE INVENTION

The invention generally relates to an $N_2O$ decomposition reactor and a method of its use to produce an effluent suitable for use in an ignition device or in the main fuel injection system in high speed aircraft. $N_2O$ decomposition is an exothermic reaction and produces a high temperature product containing high concentrations of $O_2$. If fuel is combined with this effluent in a pilot torch, it will ignite quickly and therefore the torch can be an effective ignition source for the aircraft combustor. Unique features of a reactor of this invention include, among others, that the reactor is small and is designed to process a feed flow at a rate equal to the mass of the reactor about every minute. Therefore, the quantity of heat generated causes the temperature of the reactor to rise rapidly, creating a condition where the temperature could exceed the safe operating limits of the materials used to construct the reactor. However, two features of this reactor prevent overtemperature situations from occurring. First, the reactor operates on a transient basis where the feed flow can be stopped before unsafe temperatures are reached, but which also allows superadiabatic exit temperatures to be achieved due to stored preheat energy. Second, the feed consists of a mixture of $N_2O$ and $CO_2$ instead of pure $N_2O$. The addition of $CO_2$ reduces the reactor temperature and allows it to operate for longer periods of time before reaching temperature limits. In an added benefit, $CO_2$ is very soluble in hydrocarbon fuels, and this increases its effectiveness as a barbotage gas.

In another unique feature of this disclosure, reactor performance can be adjusted to meet the conditions required for the selected application by changing the relative concentrations of $CO_2$ and $N_2O$, modifying the reactor length, and varying the quantity of catalyst in the reactor. For use in a pilot ignition device, the desired effluent temperature is between 500° C. and 1200° C. in order to ignite and combust the fuel within the design residence time, between 0.5 and 10 ms, and more preferably between 1.0 and 5.0 ms, and it is desirable that the effluent temperature remains within this range of temperatures for between 1 and 20 seconds and more preferably for 1 to 40 seconds, after $N_2O$ flow is started. For application as a barbotage gas generator in a fuel injection system, the temperature of the effluent can range from 300° C. up to 800° C. and it is desirable that the effluent temperature remains within this range for periods of up to two minutes.

An exemplary reactor herein has two concentric annular flow paths. The inner annulus is bounded on the inside by a cartridge heater and on the outside by a tube or liner which is made from stainless steel or other high temperature alloy, such as nickel-chromium-iron alloys, such as those in the Inconel® (Special Metal Corporation) family of alloys The liner is made from a metal or alloy which has high temperature strength at least as great as stainless steel. The outer annulus is bounded on the inside by the liner and on the outside by a metal or alloy tube. This tube does not reach temperatures as high as the liner and so need not be made of high temperature alloys, stainless steel (316 SS, is sufficient) . For the pilot ignition torch application where higher temperatures are needed, a ceramic insulating layer can be applied to the inside surface of the outer shell along the entire length of the reactor. The insulating layer reduces the heat losses to the environment and reduces the temperature of the metal in the outer shell. The type and thickness of the insulating layer is selected to achieve the desired temperature. Use of the insulating layer also allows the height of the annulus to be varied to maximize internal heat transfer or achieve other purposes. Other purposes of the insulating ceramic layer are to maximize the temperature of the gas exiting the reactor and reduce transient thermal stresses in the shell material, thereby increasing longevity. In a specific embodiment, the insulating layer is about ⅛ inch thick.

In an embodiment, the outside surface of the liner has unique structural features. It optionally contains fins which increase the outer surface area of the liner by up to a factor of two to five. This will improve heat transfer from the inner annulus to the outside of the annulus which improves the preheating of the incoming $N_2O$ flow. In an embodiment, the outside of the liner can also be wrapped with a metal or alloy wire. The wire maintains a constant annulus height and introduces a swirl to the incoming flow that improves heat transfer. Wire is optionally wrapped on either a non-finned or a finned liner.

A port at one end of the reactor allows the $N_2O$ feed mixture to enter the outer annulus as a liquid. The mixture flows along the length of the outer annulus to the far end of the reactor where it is transferred into the inner annulus. Once inside the inner annulus, the flow reverses direction, travels to the other end of the reactor where it exits on the same end as it entered.

A unique feature of the reactor design is that the liner is attached only at one end, the side where the $N_2O$ enters the reactor. The other end is not attached to the structure. This design serves two purposes. First, it allows the $N_2O$ feed mixture to transfer from the outer annulus into the inner annulus. Second, it accommodates the differential thermal expansion between the liner and the outer shell.

A catalyst selected from a group consisting of rhodium oxide, ruthenium oxide, zirconium oxide, silica oxide, strontium hexaaluminate and lanthanum hexaaluminate is contained in the inner annulus. The catalyst can be wall-mounted, where it is coated on the inside surface of the liner and/or on the outside of the cartridge heater. The catalyst is optionally in the form of a packed bed consisting of particles that are as large as possible, but still fit in the inside annular space. Use of larger particles of catalyst reduces the pressure drop in the catalyst bed and is preferred. In an embodiment, the catalyst is coated on a porous support, such as alumina or silica. The catalyst can also be coated on inert inorganic reticulated foam structures that are small enough to fit in the annular space, such as crushed alumina foam.

Heat is produced in the inner annulus from the catalytic decomposition of $N_2O$ into $N_2$ and $O_2$ and this is used to preheat the incoming feed flow in the outer annulus. The length of the reactor and the annulus heights are designed to allow the temperature of the incoming feed mixture to reach the minimum temperature required for the catalyst to have sufficient activity to convert a high percentage of the $N_2O$ to $N_2$ and $O_2$, while preventing the temperature in the inner annulus from reaching values that would damage the catalyst, the cartridge heater, and the liner.

Different reactor lengths are used depending on the application. For the pilot torch, the higher temperature requirement of the effluent requires that higher $N_2O$ concentrations, for example 40%-60% (mole percent) $N_2O$ (40-60% $CO_2$) be used compared to the barbotage application where the $N_2O$ concentration ranges from 25-40 mole % ($CO_2$ 60-75 mole %) Higher temperatures produced in the catalyst bed for the torch application raise the temperature of the incoming flow more rapidly, and therefore this reactor can be shorter than the reactor used for barbotage reactor. An exemplary reactor for the torch application is 16-in long while an exemplary reactor for the barbotage application is 23.5-in long.

In embodiments, reactors herein can contain multiple thermocouples spot-welded along the outer surface. Multiple thermocouples may also be located along the length inside the outer annulus. To place the annular thermocouples, holes were drilled in the outer shell and fittings were welded into the holes. The thermocouples are inserted and sealed in the fittings so that the end of the thermocouple is midway between the inner and outer walls of the outer annulus. For the barbotage application, thermocouples were also spot-welded to the liner after the reactor was assembled. Access holes were drilled in the outer shell and fittings were welded in place. After the thermocouples were attached the access holes were sealed by placing caps on the fittings. Thermocouples allow assessment, evaluation and optimization of a given reactor, but are not required for reactor operation.

Depending on the application, the quantity of catalyst and the length of the catalyst bed can be varied. In an exemplary torch application, the catalyst weight ranged from 7.5 g to 15 g, with bed lengths of 4.75-in and 9.5-in respectively. In an exemplary barbotage application, the catalyst weight was 18.8 g and the bed length was 9.1-in.

The quantity of catalyst and bed length affects the temperature exiting the reactor regardless of the $N_2O$ concentration in the feed mixture. With less catalyst and a shorter bed, for example 7.5 g and 4.75-in, the effluent temperature in a test with 47.2% $N_2O$ increased rapidly and reached 876° C. in 10 seconds and a maximum of 935° C. in 12.8 seconds. However, when the quantity of catalyst and the bed length were increased to 15.0 g and 10.0 inches and a similar $N_2O$ concentration of 46.6% was used, the effluent temperature increased more slowly, reached a maximum of 730° C. in 22.2 seconds and remained between 400° C. and 800° C. for 52 seconds. This exemplary configuration is more suitable for the barbotage application. The adiabatic decomposition temperatures for both of these mixtures was 615+/−5 degrees C. (starting with the compressed liquid mixture at 1150 psig and 70 degrees F., and ending with a 100% reacted mixture at 500 psig), underscoring the impact of the catalyst quantity, distribution, reactor geometry, and the heat stored in the reactor on conditions at the reactor exit.

In embodiments, the temperature profile and maximum temperature of a reactor herein is controlled by varying the catalyst quantity, and/or the location of the catalyst in the inner annulus or on walls of the inner annulus, and/or the amount of $CO_2$ that is added to the $N_2O$.

The flow exiting the catalyst bed, which consists of the reaction products and unreacted components, passes through a ceramic orifice with a throat diameter designed to produce the desired back pressure in the reactor at the design flow rate. The orifice is a custom choked flow venturi. The gas velocity in the throat or narrowest part of the choked-flow venturi is fixed at the speed of sound as long as the pressure in the decomposition reactor is sufficiently greater than the pressure downstream of the choked-flow venturi. This minimum choking pressure ratio depends on both the temperature and composition of the reacted mixture, however a factor of two or more is generally sufficient to insure sonic flow at the throat. Operating under choked-flow conditions isolates the $N_2O$ reactor so it is not affected by any changes in conditions that might occur downstream.

Other aspects and embodiments of the invention will be apparent to one of ordinary skill in the art on review of the drawings, detailed description and examples herein.

BRIEF DESCRIPTION OF THE DRAWINGS

FIG. 1A is the outer shell which shows the location of the ceramic liner on the inside of the outer shell. FIG. 1B shows the tube liner with a flared end on one side that is used to seal the outer annulus on assembly. FIG. 1C shows the cartridge heater which is inserted into the reactor on assembly. See FIG. 4A for an exemplary assembled pulsed torch. Exemplary dimension and relative dimensions for the OD of the elements and the length of the elements are given.

FIG. 2A is the outer shell, which in contrast to the outer shell of the torch reactor does not have a ceramic insulating layer. FIG. 2B shows the liner with a flared end on one side that is used to seal the outer annulus on assembly. FIG. 2C shows the cartridge heater which is inserted in the reactor on assembly. See FIG. 4B for an exemplary assembled barbotage reactor.

FIGS. 3A and 3B illustrate an exemplary finned tube liner for increased heat transfer surface area which can be employed in the pulsed torch reactor or the barbotage reactor. FIG. 3A illustrates the finned circumference of the tube liner giving exemplary dimensions of the fins and diameter of the tube liner. FIG. 3B illustrates a longitudinal view of an exemplary finned tube liner, with exemplary dimensions.

FIGS. 4A and 4B show diagrams of the assembled reactors. FIG. 4A is the reactor for the pulsed torch application, while FIG. 4B is a diagram of the reactor for the barbotage application. In both reactor drawings, the $N_2O$ reaction gas flows (shown as arrows) from right to left in the outer annulus and then from left to right in the inner annulus are shown as arrows.

FIGS. 5A and 5B show diagrams of the exemplary assembled reactors and include the exemplary location of the catalyst beds. In both reactors, the catalyst is packed in the inner annulus, between the cartridge heater and the inner surface of the liner. FIG. 5A is a diagram of the reactor for the torch application. The exemplary catalyst was Rh supported on $ZrO_2$. FIG. 5B is a diagram of the reactor for the barbotage application. The exemplary catalyst was Rh supported on $SiO_2$. In each case, a portion of the inner annulus is packed with inert inorganic packing material, such as crushed reticulated alumina foam, which holds the catalyst in place. In embodiments, the inert packing material can be coated with catalyst to provide a catalyzed foam.

As illustrated in FIG. 7A, the choked venturi valve is adapted from an AN fitting. An internal portion of each choked flow venturi is cast with a ceramic material that is designed to handle high temperatures and rapid changes in temperature (thermal shock). The diameter of the throat of the venturi valve is sized to generate the desired pressure inside the $N_2O$ decomposition reactor. For these applications, mass flow rate through the valve can range from 0.5 to 5.0 lb/min. In a specific embodiment, the mass flow rate ranges from 0.7 to 4.0 lb/min. In an embodiment, a pressure of approximately 400 psig is achieved at a mass flow rate of 1.47 lb/min.

FIG. 12A is a photograph of a spray field generated with RP-2 that was saturated with $CO_2$ whereas, FIG. 12B is a photograph of spray field generated under identical conditions using RP-2 that did not contain dissolved $CO_2$. Note that the size bar represents 5000 microns. The photograph in FIG. 12A with $CO_2$ saturated fuel shows that there are larger areas of a fine mist and fewer ligament structures particularly in the bottom half of the spray field compared to the photograph in FIG. 12B with neat RP-2.

DETAILED DESCRIPTION OF THE INVENTION

U.S. patent application Ser. No. 14/272,273 filed May 7, 2014 and Ser. No. 15/587,643, filed May 5, 2017 relate to catalytic heat exchanger reactors, particularly for $N_2O$ decomposition and application to ignition for jet engines. These applications and in addition U.S. provisional application 61/820,324, filed May 7, 2013 are each incorporated by reference herein for descriptions of the reactor and its operation.

U.S. provisional application 62/687,747, filed Jun. 20, 2018 and US patent application 16/447,91, filed Jun. 20, 2019 relate at least in part to a pulsed torch application of a reactor as descried herein. U.S. patent application Ser. No. 16/447,913, filed Jun. 20, 2019 also provides additional description of choked venturi valves. The entire description and drawings in this provisional application are incorporated by reference herein.

This disclosure relates to a reactor that comprises two concentric annular flow paths. The inner annulus is bounded on the inside by a cartridge heater and on the outside by a metal or alloy tube made of high temperature metal or alloy, such as nickel-chromium-iron or nickel-chromium-iron-molybdenum alloys, such as those in the Inconel® (Special Metal Corporation) family of alloys and Hastelloy® X (Haynes International). The outer annulus is bounded on the inside by the high temperature metal/alloy tube and on the outside by a metal tube which need not be made of high temperature metal or alloy, for example, 316-SS may be used. In a unique feature of this disclosure, the length of the reactor is varied to meet specific performance objectives in use in scram jet applications. When used to create a hot effluent to be used with the ignition torch, the reactor is shorter, from about 8 inches to 20-in in length. When used to produce an effluent that is mixed with the main engine fuel to improve injection, the reactor is longer, from 15 inches to 30 inches.

FIGS. 1A-1C and 2A-2C show exploded views of the reactor components for the ignition torch and for the barbotage application, respectively. FIGS. 4A and 4B show assembled views of the ignition torch and barbotage torch, respectively. Each reactor comprises three primary components.

Figure 1A:
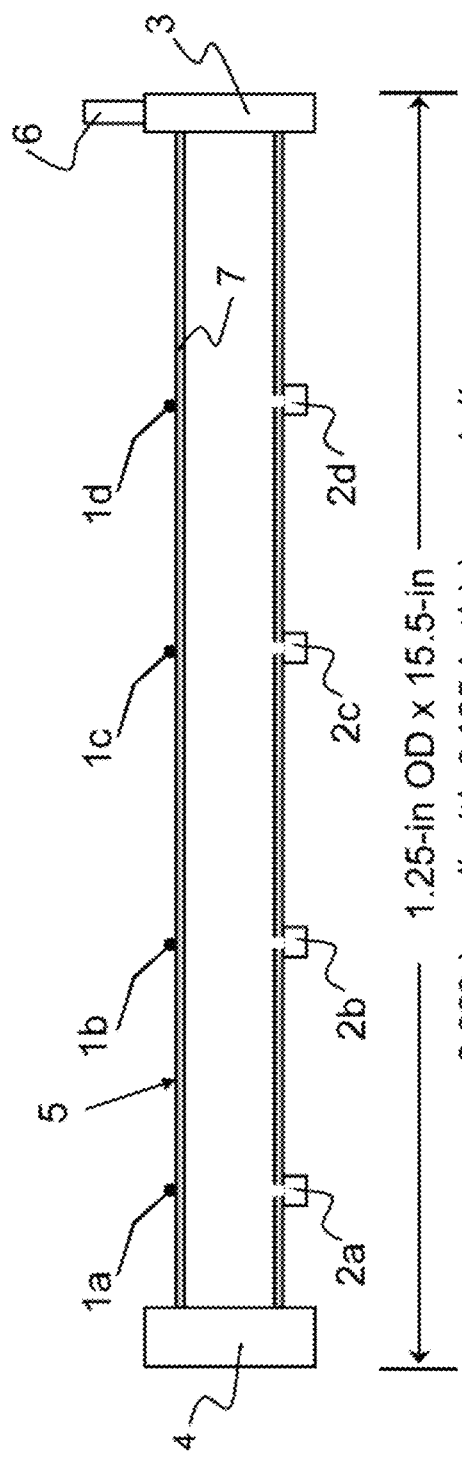
FIGS. 1A-1C show exploded diagrams of the components of an exemplary pulsed torch reactor.

FIG. 1A shows the structure of the outer shell (5) which forms a cylindrical reactor. The shell is made from metal tubing with a thin layer of ceramic insulation (7) cast on the inner surface of the outer shell (5) to insulate the metal from the high temperatures in the reactor. The thickness of the ceramic insulator layer (7) is adjusted as known in the art to achieve desired insulation in view of the temperatures involved and the metal and other materials employed. In specific embodiments, the insulation is less than ½ inch thick, in other embodiments the insulation is 1/16 to ¼ inch thick. In a specific embodiment, the insulation is about ⅛ inch thick. The outer shell (5) serves as the pressure boundary for the reactor and it has a maximum operating pressure of 800 psig as long as the maximum wall temperature remains below 800° C. The outer shell (5) is provided with a closed end fitting (4) to facilitate assembly of the reactor components, and formation of an inner annulus (16) and outer annulus (14) (see FIG. 4A). The outer shell (5) is also provided with an open flow exit end fitting (3) through which flow exits the reactor. In FIG. 1A, inlet port (6) is shown coupled through a channel in end fitting (3) into the outer annulus (14). Inlet port (6) may however enter directly through the outer shell (5) into the outer annulus (14).

Figure 1B:

FIG. 1B shows a high temperature metal or alloy tube liner (13) which is referred to herein as a tube liner with a flared fitting (11). The tube liner fits into the cylinder formed by the outer shell (5). Insertion of the tube liner (13) into the outer shell (5), such that a seal is formed between the flared fitting (11) and the end fitting (3) forms an outer annulus (14) between ceramic layer (7) and the tube liner (13). The inlet port (6) at one end of the outer shell (5) introduces the $N_2O$ reaction feed mixture into the outer annulus (14). Several thermocouples are spot-welded at selected locations (1a-d) on the outer surface of the outer shell (5) to monitor temperatures during preheat and testing (wall TCs). Several ports (2a-d) are provided on the outer shell (5) for thermocouples that measure temperatures in the outer annulus (14) (see also FIG. 6B). These thermocouples are optional, but useful for monitoring reactor operation and/or optimizing such operation. In a specific embodiment, at least one thermocouple is positioned at one end of the outer annulus distal from the inlet (6), e.g., at position 2a, to allow a temperature measurement before the gas mixture contacts the catalyst. For sustained operation the temperature at this location should be constant or increasing. If, in contrast, the temperature in the outer annulus at this point is decreasing then the reaction rate on the catalyst will decrease which will generate less energy to preheat the feed mixture and will cause the reaction to stop. It is important to adequately preheat the feed mixture.

Figure 1C:
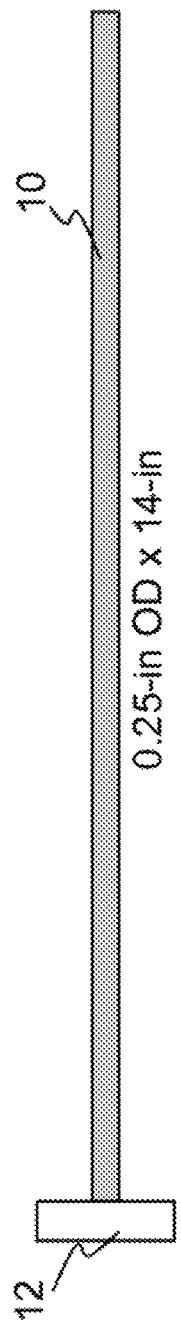

FIG. 1C illustrates the cartridge heater (10) with heater fitting (12) that is inserted into tube liner (13) and defines the inner boundary of the inner annulus (16) of the reactor which is formed between the heater cartridge (10) and the tube liner (13). The heater (10) is used to bring the catalyst and reactor walls up to operating temperature before the $N_2O$ feed mixture flow is started. The outside material of the heater is preferably made of oxidation resistant material. In some examples, the heater comes with a thermocouple located at the far end (flow exit end) of the heater.

FIG. 4A shows the assembled reactor for the ignition torch, where assembly of components form the outer annulus (14) and the inner annulus (16). The figures include arrows that show the direction of the feed flow from the flow inlet (6) through outer annulus (14), through inner annulus (16) to exit through the exit flow fitting (3). The feed flow enters the port on the right side of the reactor and then travels to the other end of the reactor in the outer annulus (14), where it is preheated to the temperature needed to achieve the needed reaction before it contacts the catalyst. The preheat temperature typically used with the Rh catalyst to rapidly initiate the catalytic decomposition reaction at startup is 400 to 500° C., but can vary according to the form and amount of catalyst present, the catalyst metal loading, the intrinsic surface area of the catalyst support ($m^2$/gram), and other factors. The preheated feed flow then enters the inner annulus (16) and moves back toward the right side where it contacts the catalyst (see FIG. 4A), causing the $N_2O$ decomposition reaction to begin.

Figure 2A:
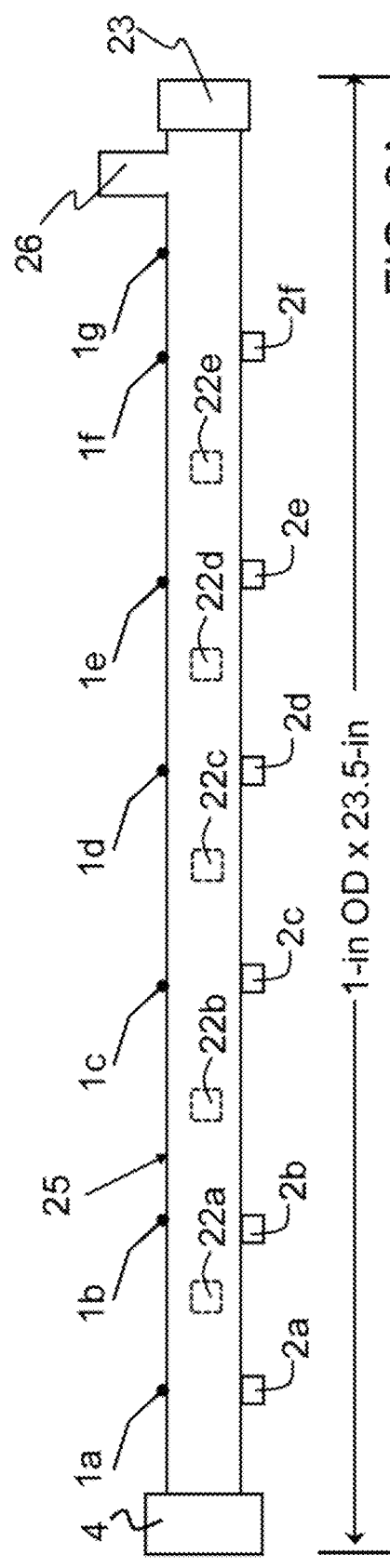
FIGS. 2A-2C show exploded diagrams of the components of an exemplary reactor for the barbotage application.
Figure 2B:
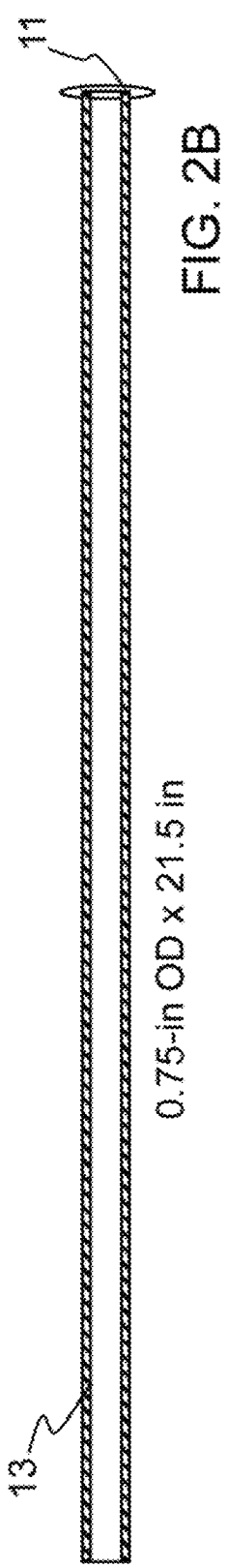
Figure 2C:
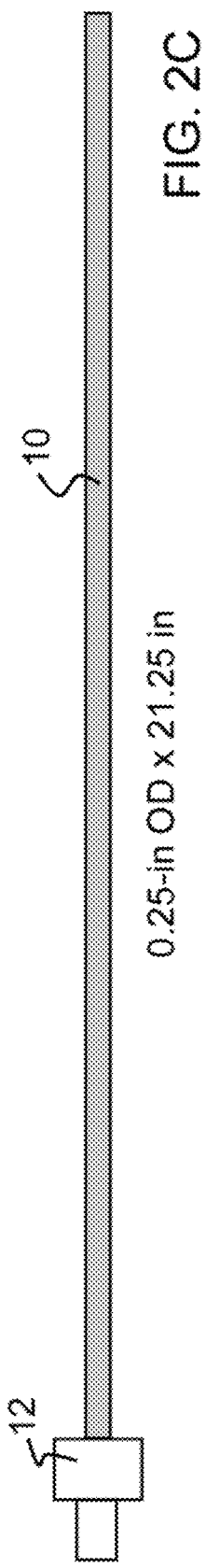

FIGS. 2A-2C show the components of an exemplary reactor for the barbotage application. Outer shell (25) is similar in structure and function to outer shell (5) of FIG.

1A, but does not have an insulating ceramic liner. The outer shell is provided with a closed end fitting (4) to facilitate assembly of the reactor components, and formation of an inner annulus (16) and outer annulus (14) (see FIG. 3B). The outer shell is also provided with an open flow exit end fitting (23) through which flow exits the reactor. In FIG. 2A, inlet port (26) is shown coupled directly through the outer shell (25) into the outer annulus (14). Several thermocouples are spot-welded at selected locations (1a-g) on the outer surface of the outer shell (25) to monitor temperatures during preheat and testing. Several ports (2a-f) are provided on the outer shell (25) for thermocouples that measure temperatures in the outer annulus (14).

These thermocouples are in general optional, but useful for monitoring reactor operation and/or optimizing such operation. In a specific embodiment, at least one thermocouple is positioned at one end of the outer annulus distal from the inlet (26), e.g., at position 2a in FIG. 2A, to allow a temperature measurement before the gas mixture contacts the catalyst. For sustained operation the temperature at this location should be constant or increasing. If, in contrast, the temperature in the outer annulus at this point is decreasing then the reaction rate on the catalyst will decrease which will generate less energy to preheat the feed mixture and will cause the reaction to stop. It is important to adequately preheat the feed mixture, particularly for the barbotage application.

FIG. 2B shows high temperature metal or alloy tube liner (13) again with flared fitting (11). The tube liner fits inside of the cylinder formed by the outer shell. Insertion of the tube liner (13) into the outer shell (25) with flared fitting (11) engaged with end fitting (23) forms an outer annulus (14) between the outer shell (25) and the tube liner (13). The inlet port (26) at one end of the outer shell (25) introduces the $N_2O$ reaction feed mixture into the outer annulus (14). Outer shell (25) is also provided with several ports (22a-e) for thermocouples to measure temperatures of the outside of liner (13).

FIG. 2C shows the cartridge heater (10) with heater fitting (12) that is inserted into tube liner (13) and defines the inner boundary of the inner annulus (16) of the reactor which is formed between the heater cartridge (10) and the tube liner (13). The heater (10) is used to bring the catalyst and reactor walls up to operating temperature before the $N_2O$ feed mixture flow is started. In some examples, the heater comes with a thermocouple located at the far end (flow exit end) of the heater. FIGS. 2A-2C give exemplary OD and length dimensions of the components.

The tube liner (13) of the reactor is made of a high temperature metal alloy that is preferably oxidation-corrosion resistant. Stainless steel or other metals or alloys may be used. Nickel-chromium-iron alloys, such as those in the Inconel® (Special Metal Corporation) family of alloys are useful for tube liners herein. Nickel-chromium-iron-molybdenum alloys, such as that commercially available as Hastelloy® X (Haynes International), are also useful for tube liners. A number of high temperature alloys which exhibit oxidation-corrosion resistance are known in the art and one of ordinary skill in the art can chose from among the alternatives available those that are appropriate for use in the reactors of this invention.

In an embodiment, fins (34) can be added to the outside of the liner (13), as illustrated in FIGS. 3A and 3B to increase surface area and improve heat transfer. In FIG. 3A, the spacing between fins (35) the width of a fin (36) and the height of a fin (37) are shown and exemplary dimensions are given. Also shown are the outside diameter (38) of the finned tube, the inside diameter of the finned tube (39) and the thickness (40) of the tube liner without fin and exemplary dimensions are given. FIG. 3B provides a longitudinal view of the finned tube liner (33) carrying a plurality of fins (34). Stainless steel, among other materials, can be used for the finned tube liner. High temperature alloys, such as nickel-chromium-iron alloys or nickel-chromiun-iron-molybdenum alloys, such as those in the Inconel® (Special Metal Corporation) family of alloys, or Hastelloy® X are desirable because they are more oxidation resistant than stainless steel. Oxidation resistance is desirable because high temperature oxygen is produced by the $N_2O$ decomposition reaction in the inner annulus.

In specific embodiments, the high temperature alloy employed is Inconel®600, Inconel®625, Iconel®800 or Hastelloy®-X. The composition of these commercially available alloys is known in the art.

In specific embodiments, the heater cartridges employed in the reactors herein have an outer shell which is made from a high temperature alloy which is corrosion resistant, such as Iconel® 800.

In specific embodiments, the heater surface, and the inside surface of the tube liner is coated with a layer of a suspension of fine $ZnO_2$ particles as an added barrier to oxidation. More specifically, a Pryo-Paint™ 634-ZO (Aremco Products, Inc.) product can be used to provide an oxidation-protection layer on the internal metal, alloy or ceramic surfaces of the reactors herein. It will be appreciated by those of ordinary skill in the art that other products can be employed to provide refractory coatings (Zn oxide, alumina, etc.) on internal surfaces of the reactors herein. The barbotage reactor outer shell of FIG. 2A was not provided with a ceramic liner in exemplary embodiments herein because heat loss was not believed to be a significant issue. However, in an embodiment, the barbotage reactor can be provided with a ceramic liner similar to that shown and described in FIG. 1A.

FIGS. 4A and 4B show the assembled reactors for the ignition torch and barbotage reactors, respectively. The figures include arrows that show the direction of the feed flow. The feed flow (46) enters the port on the right side of the reactor and then travels to the other end of the reactor in the outer annulus (14), where it is preheated to the temperature needed to achieve the needed reaction before it contacts the catalyst. The preheat temperature typically used with Rh catalyst to rapidly initiate the catalytic decomposition reaction at startup is 400 to 500° C., but can vary according to the form and amount of catalyst present, the catalyst metal loading, the intrinsic surface area of the catalyst support ($m^2$/gram), and other factors. The preheated feed flow then enters the inner annulus (16) and moves back toward the right side where it contacts the catalyst, causing the $N_2O$ decomposition reaction to begin. Gas products then exit the reactor (47). The plurality of TC's (22a-22e) for measurement of the outside of the tube liner are not shown in FIG. 4B.

FIGS. 5A and 5B show exemplary locations of the catalyst in the reactor for the ignition torch and barbotage reactors, respectively. The catalyst can be contained in the packed bed as shown here or it can also be coated on the inside wall of the tube liner (13) and/or outside wall of the cartridge heater (10). In the illustrated embodiment, the catalyst is packed in the inner annulus (16), between the outer surface of the cartridge heater (10) and the inner surface of the liner (13). Catalyst (50) is positioned in portion of the inner annulus (16). Another portion of the inner annulus (16), contains inert inorganic foam or any inert diluent (51). In embodiments not specifically shown, a portion of the uncatalyzed foam can be replaced with catalyzed foam. Catalyzed foam is a catalytically inert inorganic foam coated with active catalyst. A final portion of the inner annulus just proximal to the exit is optionally packed with uncatalyzed foam (52). Uncatalyzed or catalyzed foam is employed in part to maintain catalyst in selected positions in the inner annulus. FIG. 5A shows an exemplary catalyst configuration for the torch application where the catalyst (50) is loaded in a back portion of the inner annulus proximal to the flow exit (47). A front portion of the inner annulus distal to the flow exit is loaded with inert inorganic foam (uncatalyzed filler/foam) (51), such as crushed reticulated alumina. In specific examples, catalyst 50 varies between 7.6 grams mixed with 27.6 grams of $ZrO_2$ diluent to 15.0 grams mixed with 55 grams of $ZrO_2$ diluent with the front of the reactor packed with crushed alumina foam. In an optional embodiment, a small portion of the inner annulus proximal to the flow exit (47) (back of the reactor) also contains uncatalyzed foam.

FIG. 5B shows an exemplary catalyst configuration used in the barbotage application. The catalyst in this example application comprises Rh supported on $SiO_2$. In the illustrated example catalyst configuration of FIG. 5B a front portion of the inner annulus 16 (distal from the flow exit 47) is packed with supported catalyst (50) and a back portion of the inner annulus proximal to the flow exit 47 is packed with uncatalyzed foam (51). In an embodiment not shown, a portion of the uncatalyzed foam can be replaced with catalyzed foam. A small portion of the inner annulus proximal to the flow exit is optionally packed with uncatalyzed foam (52). In an embodiment of the reactor of FIG. 5B, 18.8 g of supported catalyst is packed in the front end of the annulus (distal from the flow exit), resulting in a bed length of 9.1-inches. In this embodiment, the catalyst was followed by 9.1 inches of crushed alumina foam, and the final 2.875-in of the annulus was filled with uncoated, crushed alumina foam. The catalyst configurations illustrated in FIGS. 5A and 5B are illustrative and not limiting.

In embodiments, the ignition reactor (torch reactor) is shorter than the barbotage reactor. The barbotage reactor generally is operated at lower temperature than the ignition reactor. Typically, more $CO_2$ is mixed with the $N_2O$ in the barbotage reactor compared to the ignition reactor. Adding more $CO_2$ generally reduces the temperature in the catalyst bed, which in turn reduces the rate that the flow of feed is preheated in the outer annulus. In this case, a longer path is typically required to for the incoming feed to reach the temperature needed to be active when the feed contacts the catalyst.

In generally, the amount catalyst incorporated into a reactor, and the ratio of catalyst to inert diluent is adjusted to achieve a desired temperature profile. With addition of more catalyst, it was generally observed that the gas temperature exiting the reactor was somewhat lower and more consistent which is better for barbotage. Using less catalyst the temperature of gas exiting was generally hotter more quickly but then decrease which was preferred for the ignition torch reactor.

In a preferred embodiment, the feed entering the reactor is in a two-phase state at a pressure of at least 600 psig. In another preferred embodiment, the feed mixture enters the outer annulus at a location directly across from the catalyst in the inner annulus and the heat of reaction is used to provide the enthalpy to vaporize the feed mixture. This configuration limits the maximum temperature reached in the inner annulus and limits damage to the catalyst. After being fully vaporized the mixture continues to flow and heat up along the length of the outer annulus to the far end of the reactor, where it transfers into the inner annulus. Once inside the inner annulus, the flow reverses direction and contacts the catalyst.

Figure 6A:
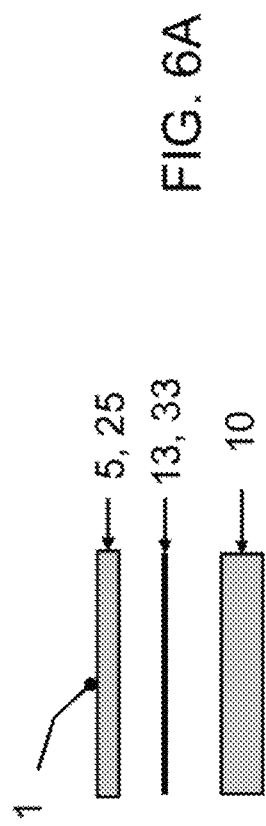
FIGS. 6A-6C illustrate three different types of temperature measurements that were made. Thermocouples (FIG. 6A) were spot welded on the outer surface of both torch and barbotage reactors at the locations shown in FIG. 1A and FIG. 2A and described as Wall TCs. Thermocouples were also inserted into the outer annular paths of both reactors, preferably spaced evenly between the outer shell and the liner as shown in FIG. 6B. The locations of the ports installed in the reactors for these measurements are shown in FIG. 1A and FIG. 2A. Finally, for the barbotage reactor, thermocouples were spot welded on the outside of the liner as illustrated in FIG. 5C. Locations for these measurements are shown in FIG. 2A.
Figure 6B:
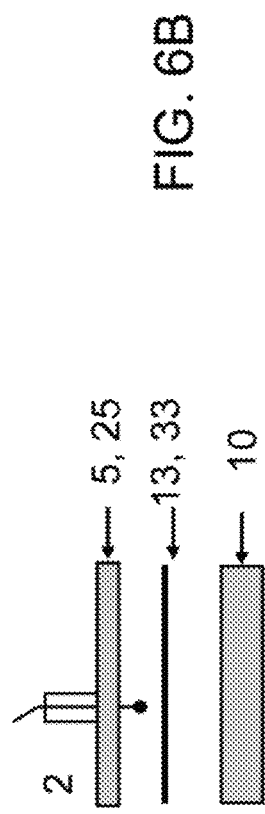
Figure 6C:
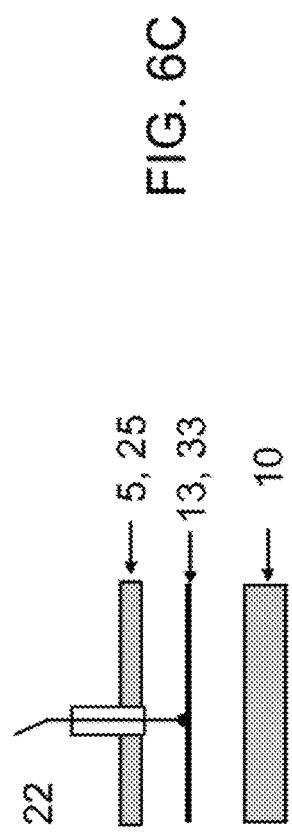

FIGS. 6A-6C show the locations of the thermocouples (TC) on the outer wall and inside the outer annulus for the ignition torch and barbotage reactors. The temperature measurements on the outer wall, with TC spot welded (1) to the outer wall of the outer shell (5, 35) of the reactors as shown in FIG. 6A, can be monitored during transient operation and if they exceed set values, the reaction can be stopped. During transient operation, temperatures measured at these locations can also be used to evaluate the effectiveness of preheating. FIG. 6B illustrates a TC positioned in the outer annulus through TC port 2 to measure temperatures therein. FIG. 6C illustrates a TC positioned at the outer wall of the tube liner (13, 33). A TC is introduced through port 22 (see FIG. 2A) and spot welded to the outer wall of liner (13, 33). In a preferred embodiment for the barbotage application, the temperature measured at 2a in FIG. 2A must be constant or rising to achieve sustained operation for the necessary time period. If the temperature at this location is decreasing, the reaction will stop prematurely.

Figure 7A:
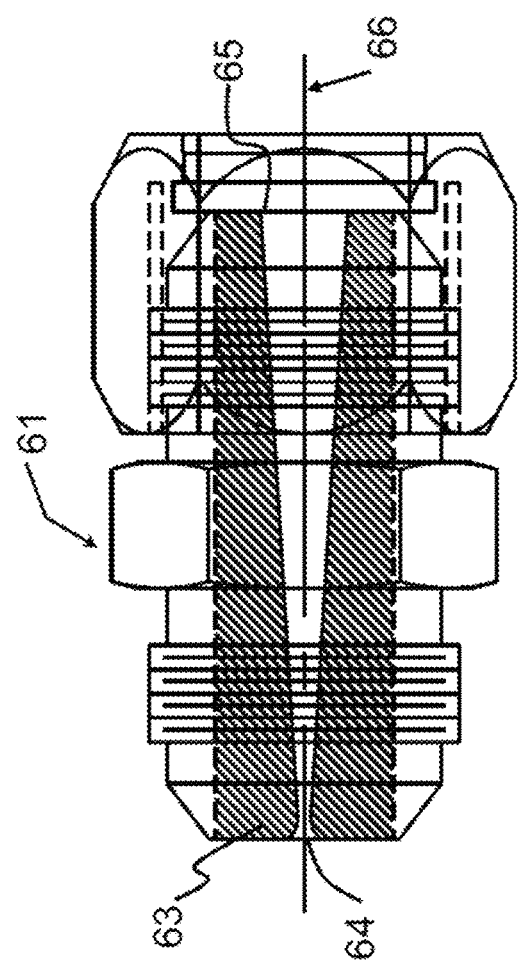
FIG. 7A illustrates an exemplary choked venturi valve useful in the reactors herein.
Figure 7B:
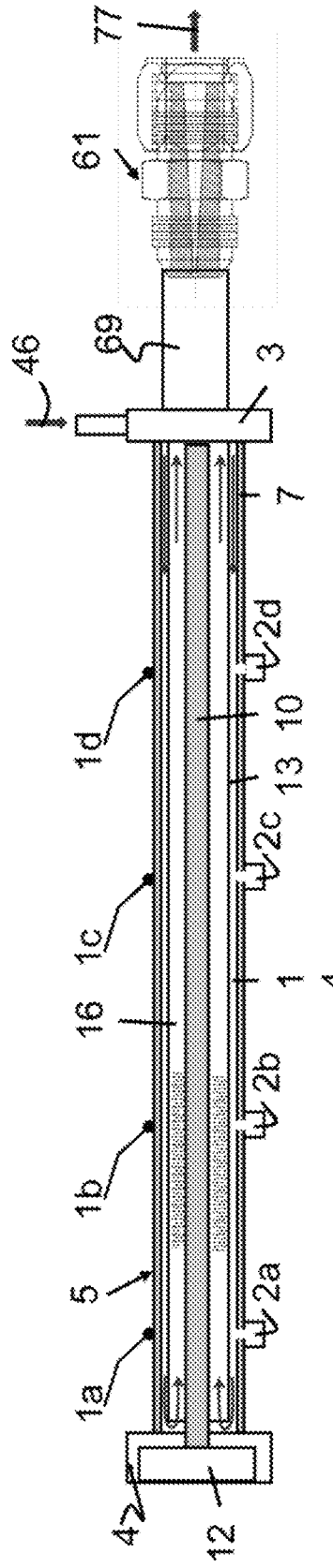
FIGS. 7B and 7C show assembled reactors with the approach tubes (69) and the choked flow venturi valves (61) on the ignition reactor and the barbotage reactor, respectively.
Figure 7C:
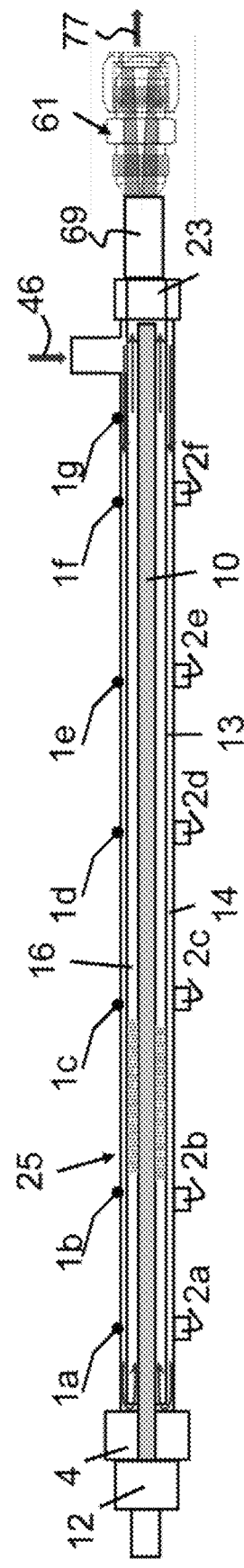

FIG. 7A illustrates an exemplary choked venturi valve (61) for use in reactors of this invention. FIGS. 7B and 7C show the assembled reactor with the flow exiting though the choked flow venturi for the ignition torch and barbotage reactors, respectively. In a preferred embodiment, the flow through the venturi has a velocity equal to the speed of sound. In another embodiment, the flow restriction of the venturi maintains a pressure of between 400 and 650 psig in the reactor. The venturi valve (61) illustrated in FIG. 7A is adapted from a conventional AN fitting. The shaped channel (62) through the fitting is shaped to provide the venturi valve by casting a ceramic material (63) in the desired shape to form the valve throat (64) and valve exit (65). The shaped channel (62) is symmetrical with respect to the center line of the valve (66) (i.e., the center line of the AN fitting). One of ordinary skill in the art understands that a variety of shaped channels can be used to provide the choked venturi effect. One of ordinary skill in the art can select a valve shape appropriate for use in the reactors herein in view of the descriptions herein and what is well-known in the art.

FIG. 7B illustrates a reactor as in FIG. 4A or 5A adapted to have a choked venturi valve (61) coupled to the end fitting (3) through which flow exits the reactor (77). FIG. 7C illustrates a reactor as in FIG. 4B or 5B adapted to have a choked venturi valve (61) coupled to the end fitting (23) through which flow exits the reactor (77). The choked venturi valve is coupled to the respective end fitting through an approach tube (69). The approach tube is a tube of selected length matched in OD with the open end fitting (3). Exemplary length of the approach tube is 5 inches with an OD of 0.75 in. Use of this tube facilitates connection of the reactor to the choked flow venturi valve. The tube which is made of stainless steel or high temperature alloy (as described herein) has a ceramic lining as illustrated for ceramic lining 7 in FIG. 1A. The approach tube can be provided with one or more ports for introduction of one or more thermocouples, which allow measurement of the temperature of the gas leaving the reactor before it enters the venturi valve. The approach tube can also be provided with a gas sample port for sampling the gas exiting the reactor.

Figure 8:
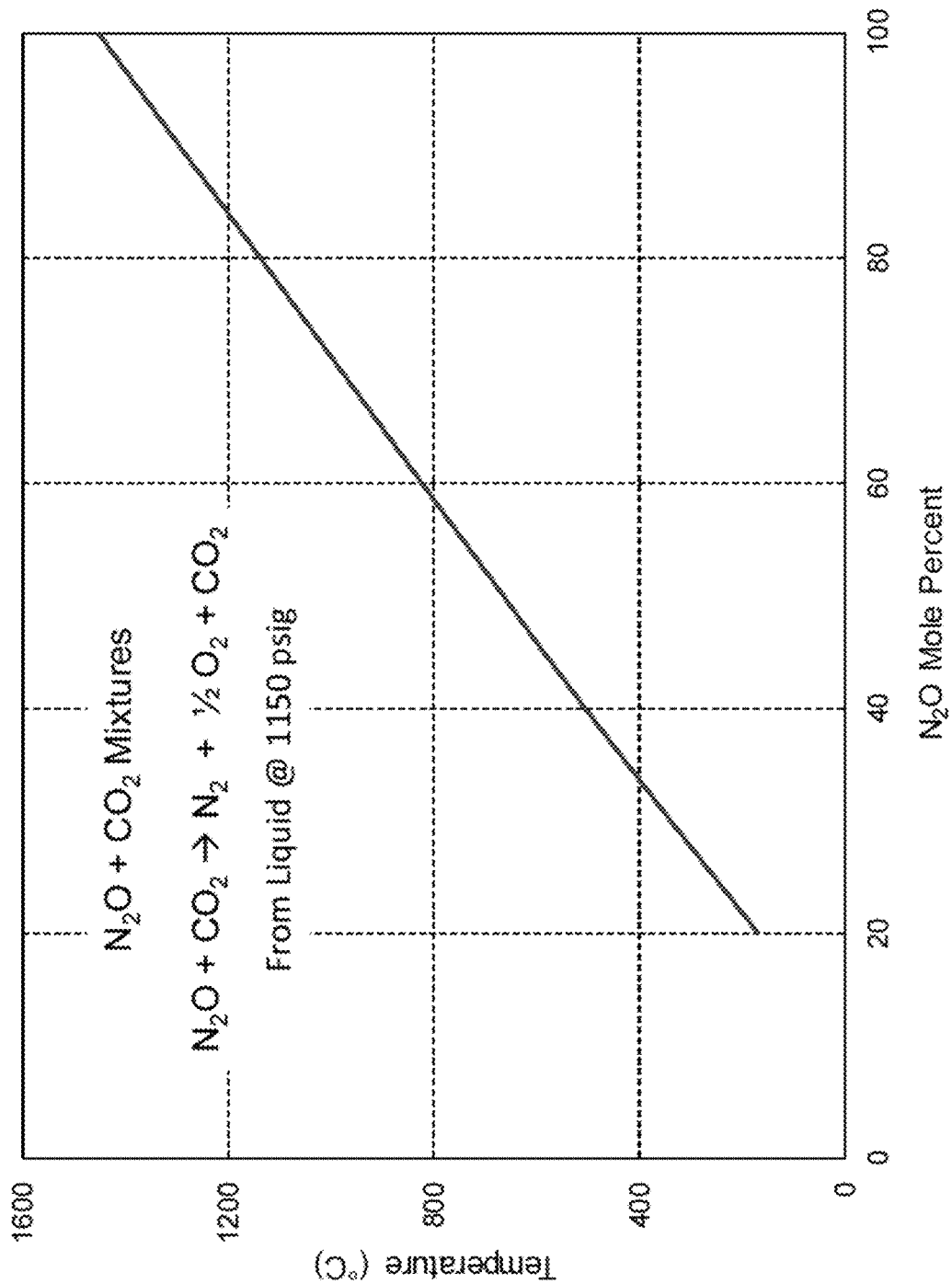
FIG. 8 shows the adiabatic temperature that can be reached from $N_2O$ decomposition as a function of $CO_2$ concentration in the $N_2O/CO_2$ feed mixture, starting with a compressed liquid at 25° C.

In a preferred embodiment of the invention, the temperature of the effluent can be controlled by adjusting the relative concentrations of $N_2O$ and $CO_2$ in the mixture. Higher concentrations of $N_2O$ will produce higher temperatures. FIG. 8 shows the ideal adiabatic temperature that is reached with $N_2O$ decomposition as a function of $N_2O$ concentration in an ideal gas $N_2O/CO_2$ feed mixture. At 100% $N_2O$, the adiabatic decomposition temperature for $N_2O$ gas starting with a compressed liquid at 25° C. and forming $N_2$ and $O_2$ is 1452° C. This temperature is high enough to damage the catalyst and reactor components. With the reactor size and flow rates specified herein, the reactor temperature can reach high temperature quickly, which will damage the both the reactor and the catalyst. However, when $CO_2$ is added to the $N_2O$ feed, the maximum temperature decreases linearly with $CO_2$ concentration and the reactor can operate for the needed time before exceeding safe operation temperatures. For example, with a mixture of 60% $N_2O$ and 40% $CO_2$ (mole percent) the ideal gas adiabatic decomposition temperature is 822° C. and with a mixture containing 40% $N_2O$ and 60% $CO_2$, the ideal gas adiabatic decomposition temperature is 504° C.

Figure 9:
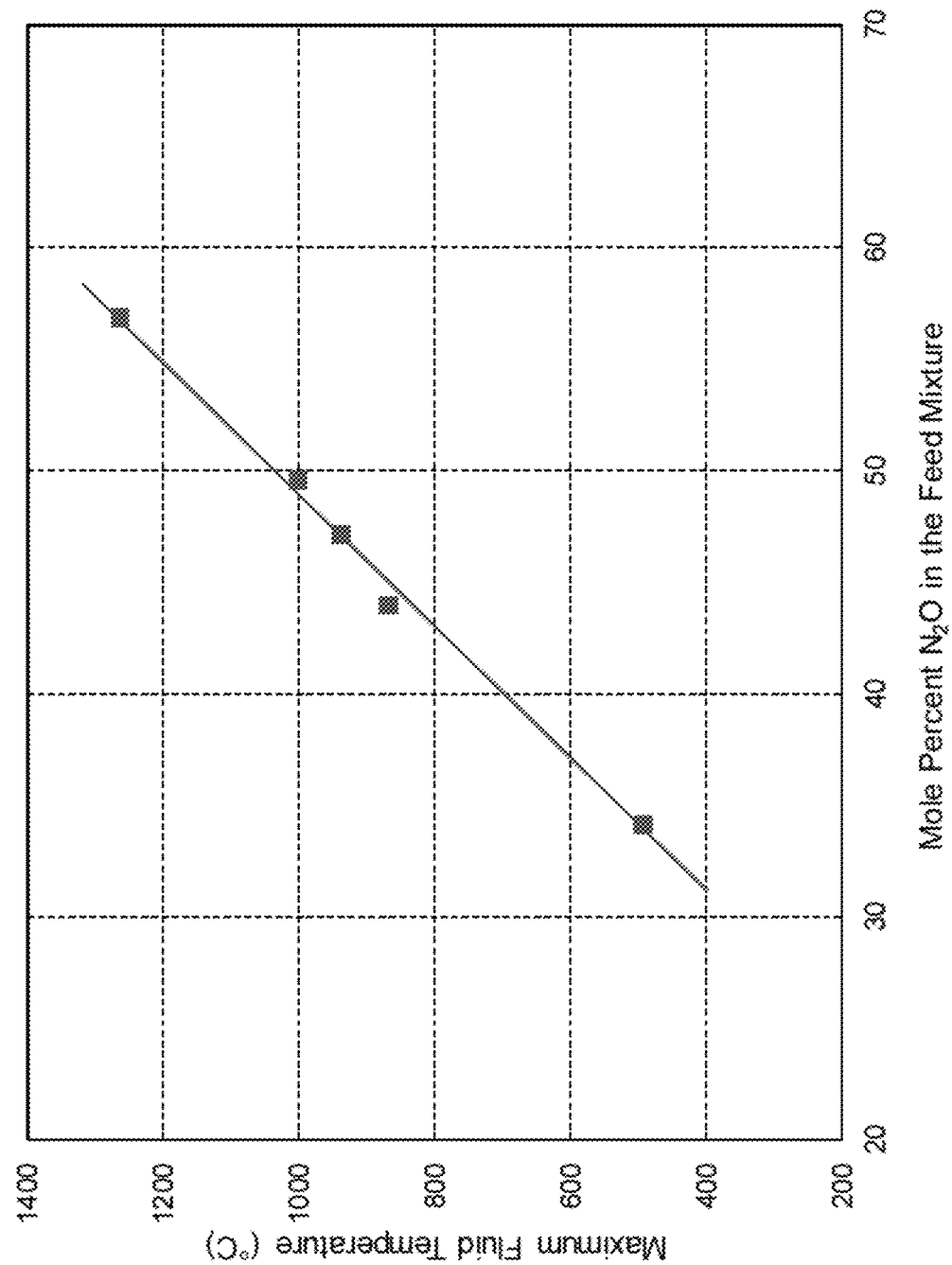
FIG. 9 shows the maximum temperatures reached in tests with various concentrations of $N_2O$. This shows that the maximum temperature reached can be controlled by adjusting the relative concentrations of $N_2O$ and $CO_2$ in the mixture. These temperatures are higher than those shown in FIG. 8, which shows that significant energy can be added to the mixture by quenching the preheated catalyst and reactor mass over short periods of time.

FIG. 9 shows that adding $CO_2$ to the $N_2O$ in the feed tank to reduce the $N_2O$ concentration does in fact control temperature in the reactor. The figure shows the maximum temperatures reached in laboratory tests with various concentrations of $N_2O$ in $CO_2$ for mixtures starting in the compressed liquid state at 1150 psig and 70 F. This figure shows that the maximum reactor exit temperatures ranged from 492° C. at an $N_2O$ concentration of 34.2% up to 1263° C. at 56.9% $N_2O$ with a reactor exit pressure near 500 psig. The fact that the maximum measured exit temperatures exceed the adiabatic decomposition temperature is due to the addition of heat stored in the reactor during preheating.

Figure 10:
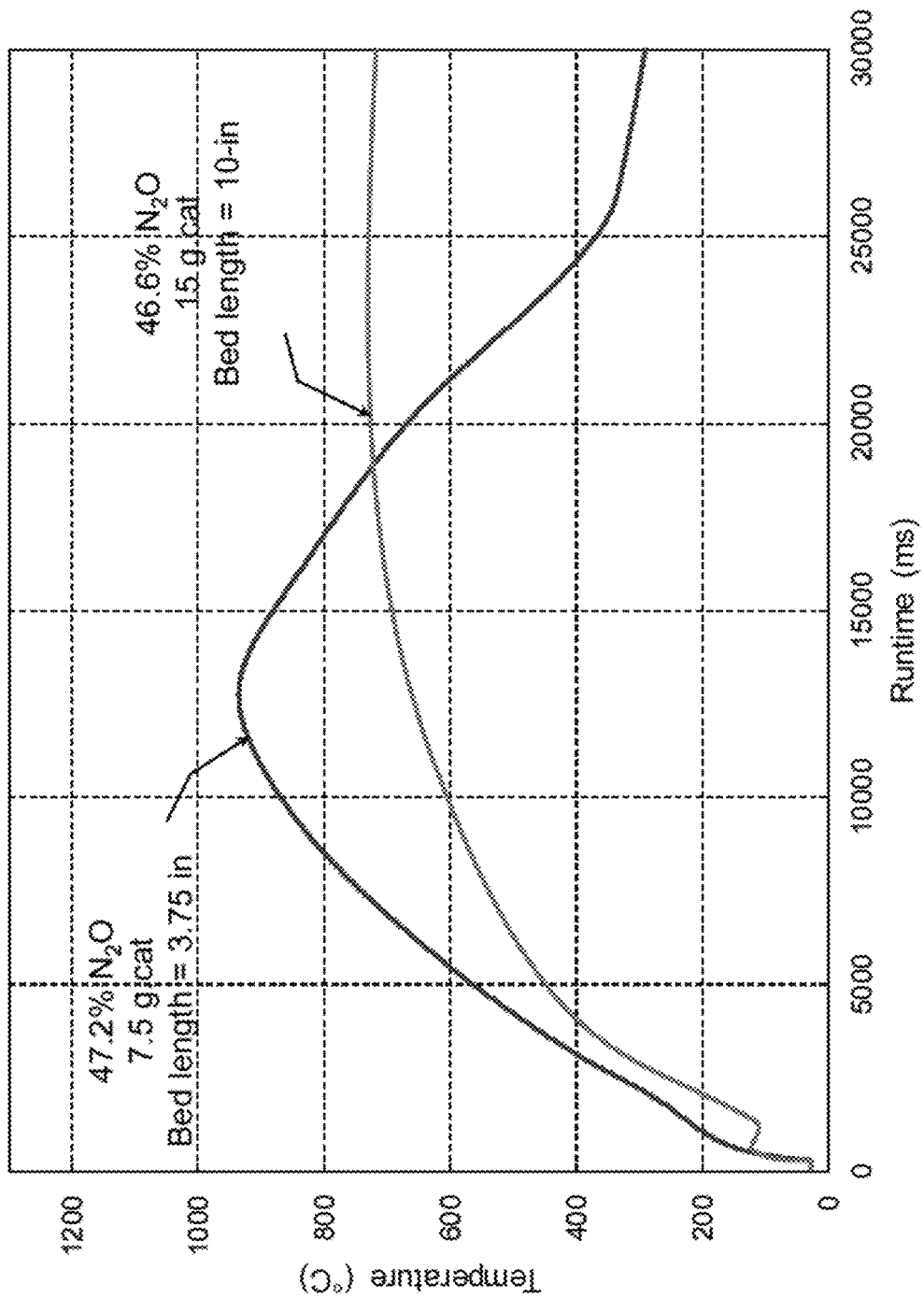
FIG. 10 shows the different transient behaviors with similar amounts of $N_2O$ in the mixture. With 7.5 grams of catalyst, the fluid exit temperature reached a maximum in 12,500 ms. With 15 grams of catalyst, the maximum was reached at 25,000 ms and the temperature was stable, remained between 800 and 900° C. between runtimes of 20,000 and 30,000 ms or for 10 seconds.

In another embodiment, the transient behavior of the reactor can also be controlled by the quantity and the location of the catalyst that is contained in the reactor. FIG. 10 shows the fluid exit temperatures in two tests with the reactor described in this invention. In one case, with 7.5 grams of catalyst and a bed length of 3.75-in, the temperature rose quickly and reached a maximum value of 936° C. in 12,690 ms (12.69 s). In another test where the quantity of the catalyst and bed length were increased to 15 grams catalyst and 10 inches respectively, the temperature rose more slowly, reached a maximum temperature of 731° C. at 22500 ms (22.5 s), and maintained a constant temperature for 30,000 ms (30 s). FIG. 10 also shows that the transient thermal storage and heat transfer process can increase the effluent temperature significantly above the adiabatic decomposition temperature for short periods of time.

The ability to adjust the transient behavior of the reactor is an important feature of the present reactor device. When the reactor is used with an ignition torch, the temperature of the effluent must rise quickly and reach its operating temperature quickly, for example in less than 20 seconds from the start of the $N_2O$ flow, but it is only necessary to maintain the desired temperature range between 800° C. and 1100° C. for a short time, less than 20 seconds. On the other hand, for the barbotage application, the operating temperature can be as low as 400° C., but the flow should last for up to two minutes. In this embodiment, the behavior of the reactor can be modified for each application by changing the reactor length, the quantity of catalyst and the location of the catalyst.

In embodiments, both the amount of $CO_2$ added to the $N_2O$ reactor feed and the amount and location of catalyst can be adjusted to achieve the desired reactor behavior.

In a separate embodiment, a coating of fuel can be applied to the catalyst prior to use. During the heating process, the fuel will combust and provide sufficient heat to preheat the catalyst and initiate the $N_2O$ decomposition reaction, thereby reducing the power and energy supplied by the cartridge heater.

In embodiments, the invention provides a catalytic $N_2O$ decomposition process conducted in a reactor, where the rate of heat generated by the decomposition reaction causes the reactor temperature to rise rapidly and exceed its maximum allowable temperature, thereby requiring methods to control the reaction temperature. In embodiments, the mass flow of feed mixture introduced into the reactor and flowing through the catalyst equals or exceeds the weight of the decomposition reaction each minute. In embodiments, the reaction temperature is controlled and the reactor is prevented from exceeding its maximum operating temperature by operating the reactor for a short period and stopping the feed flow before the reactor temperature exceeds its safe limits. In an embodiment, reaction temperature is controlled by comprises diluting $N_2O$ with $CO_2$ in the feed into the reactor. In an embodiment, the reactor size, catalyst quantity, and catalyst location are selected to provide an effluent from the reactor that reaches a temperature range of between 800° C. and 1200° C. in less than 20 seconds and maintains that temperature range for up to 20 seconds. In an embodiment, reactor size, catalyst quantity, and catalyst location are selected to provide an effluent that can be used to ignite fuel in a pilot ignition torch. In an embodiment, reactor size, catalyst quantity, and catalyst location are selected to provide an effluent that reaches a temperature range of between 400° C. and 800° C. and maintains that temperature range for up to two minutes.

In an embodiment, the catalyst provided in the reactor comprises rhodium oxide. In an embodiment, the catalyst provided in the reactor comprises rhodium oxide supported on zinc oxide. In an embodiment, the catalyst provided in the reactor comprises rhodium oxide supported on silica.

In embodiments, the invention provides a catalytic $N_2O$ decomposition reactor where changing the size of the reactor, the quantity of catalyst, and the location of the catalyst is used to control the temperature profile of the effluent of the reactor. In embodiments, the invention provides a catalytic $N_2O$ decomposition reactor where diluting $N_2O$ with $O_2$ is used to control the temperature profile of the effluent from the reactor. In an embodiment, the reactor size, catalyst quantity, and catalyst location are selected to provide an effluent from the reactor that reaches a temperature range of between 800° C. and 1200° C. in less than 20 seconds and maintains that temperature range for up to 20 seconds. In an embodiment, reactor size, catalyst quantity, and catalyst location are selected to provide an effluent that can be used to ignite fuel in a pilot ignition torch. In an embodiment, reactor size, catalyst quantity, and catalyst location are selected to provide an effluent that reaches a temperature range of between 400° C. and 800° C. and maintains that temperature range for up to two minutes. In an embodiment, reactor size, catalyst quantity, and catalyst location are selected to provide an effluent that can be used to mix with the main fuel supply to reduce viscosity and improve fuel atomization. In an embodiment, the catalyst in the reactor comprises rhodium oxide. In an embodiment, the catalyst in the reactor comprises rhodium oxide supported on zinc oxide. In an embodiment, the catalyst in the reactor comprises rhodium oxide supported on silica.

In an embodiment, the invention provides a catalytic $N_2O$ decomposition reactor which comprises an inner and an outer annulus in flow communication with each other, wherein feed is introduced into the outer annulus and passes into the inner annulus, wherein the inner annulus comprises catalyst, and wherein feed entering the reactor into the outer annulus is preheated to a selected temperature in the outer annulus prior to contacting the catalyst in the inner annulus.

In an embodiment, the catalytic reactor comprises a heater in thermal contact with the inner annulus, the outer annulus is in thermal contact with the inner annulus and heat produced in the inner annulus by reaction and heat generated by the heater function to facilitate reaction in the inner annulus and preheat the feed in the outer annulus. In an embodiment, at least a portion of the walls of the outer annulus are ribbed to enhance heat transfer from the inner annulus to the outer annulus and the feed therein. In an embodiment, the catalytic reactor comprises a choke venturi at the exit from the reactor.

In embodiments, the reactor is constructed by providing an outer shell of selected inner and outer diameter, a tube liner of selected inner and outer diameter, a cylindrical heater of selected outer diameter wherein an inner annulus and an outer annulus are formed by inserting the tube liner into the outer shell and inserting the cylindrical heater into the tube liner, the inner annulus is formed between the heater surface and the inner surface of the tuber liner, the outer annulus is formed between the outer surface of the tube liner and the inner surface of the outer shell. In an embodiment, reactor has a proximal and distal end wherein feed enters and effluent exits the reactor at the proximal (feed entry/effluent exit end) and the distal end of the reactor is sealed externally, but allows passage of feed from the outer annulus to the inner annulus. At the proximal end of the reactor, the outer annulus and inner annulus are not in fluid communication. At the proximal end of the reactor feed enters the inner annulus. At the proximal end of the reactor, effluent gas exits the rector after catalytic reaction of feed with catalyst. Catalyst for decomposition of $N_2O$ is provided in the inner annulus, in one or more packed beds or as a coating on at least a portion of the walls forming the inner annulus. In an embodiment, no catalyst is provided in the outer annulus. In an embodiment, feed enters the outer annulus, passes into the inner annulus where the feed contacts catalyst and decomposition reaction occurs and effluent exits the inner annulus and exits the reactor. In an embodiment, gas effluent from the reactor exits the reactor through a choked venturi valve. In an embodiment, one or more thermocouples are provided in the reactor to measure temperature in the reactor. In an embodiment, at least one thermocouple is provided at the point where feed exits the outer annulus and enters the inner annulus. In an embodiment, temperature at the point where feed exits the outer annulus and enters the inner annulus is monitored. In an embodiment, temperature at the point where feed exits the outer annulus and enters the inner annulus is controlled such that it is constant or increasing rather than decreasing by adjustment of feed flow, relative concentration of $N_2O$ to $O_2$ in the feed, and/or heater temperature.

Barbotage Application

In a preferred embodiment, the concentration of $N_2O$ in the mixture is maintained at a level of about 30%, which keeps the temperature of the exit fluid low, equal to or less than 600° C.

In a preferred embodiment, the reduced temperature in the catalyst bed reduces the temperature difference between the inner and outer annulus so a longer reactor, between 15 and 30 inches, is required to preheat the incoming flow to the needed temperatures. The reduced temperature also generates a need to increase the quantity of the catalyst to between 10 and 15 grams resulting in a bed length of 5 to 15 inches.

Using a longer catalyst bed results in a lower, but more stable, temperature in the fluid exit compared to a shorter catalyst bed, which is a desirable condition for this application.

Figure 11:
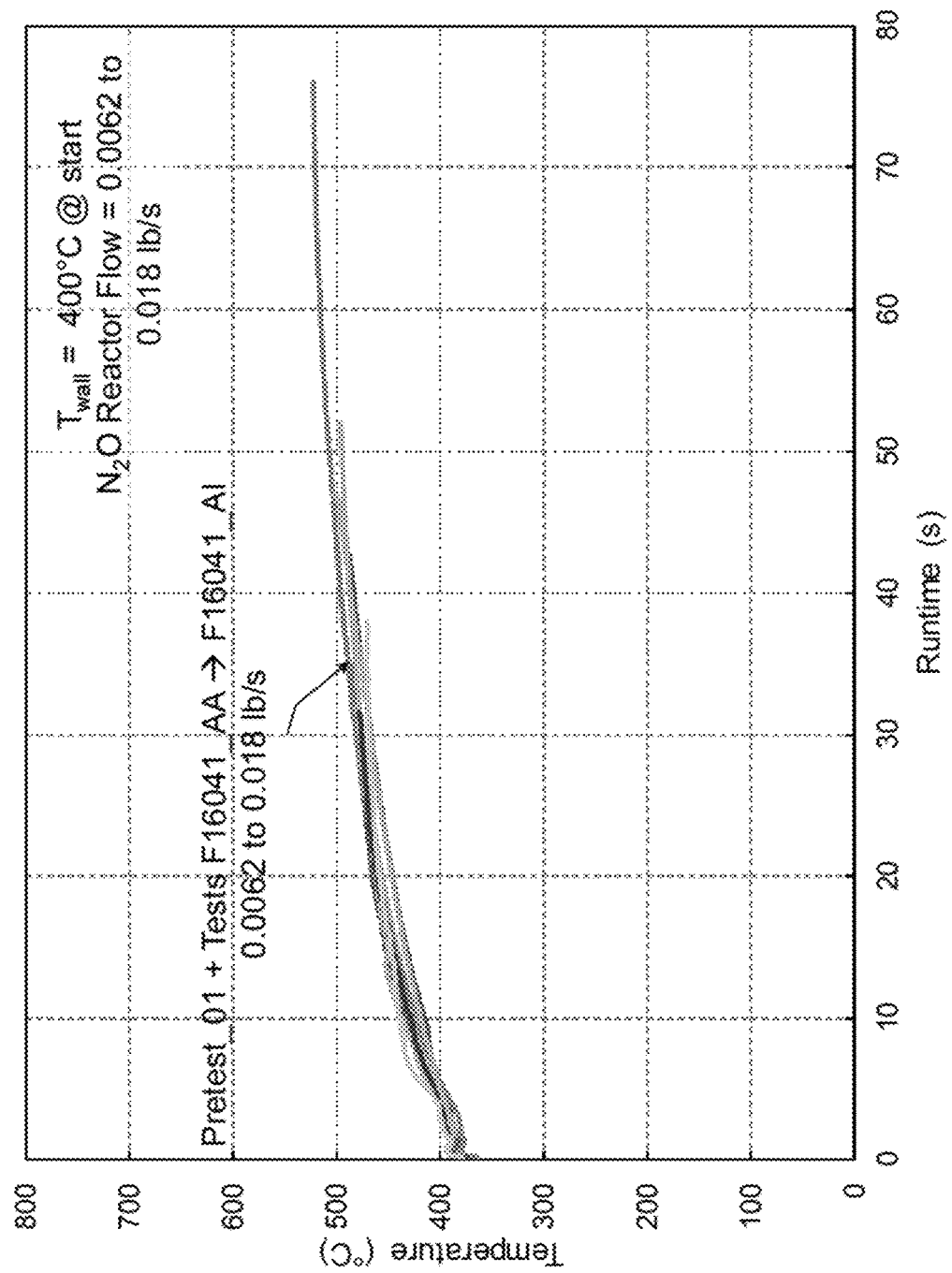
FIG. 11 shows temperatures measured at the far end of the outer annulus, just before the flow was directed into the inner annulus (at TC location 2a in FIGS. 2B and 4B) during barbotage tests. In all cases, the temperature was rising as the flow entered the inner annulus which is the requirement for stable reactor performance in the barbotage application. If the temperature is falling at this location, then the reaction rate will drop rapidly and stop.

In a preferred embodiment for the barbotage application, the temperature of the preheated mixture measured at 2a in FIG. 2A, must not be decreasing during the test in order to achieve the needed operation time. This embodiment has been demonstrated. FIG. 11 shows the gas temperatures measured at this location during a series of tests for the barbotage application. In all cases, the temperatures measured at that location were increasing during the test.

In another embodiment the percent $N_2O$ conversion must be increasing or level at 100% during the test in order to reach the needed operating time. If the temperature reaching the catalyst is increasing as described in the previous embodiment, then the percent $N_2O$ conversion will be increasing as long as the catalyst is not deactivating.

Figure 12A:
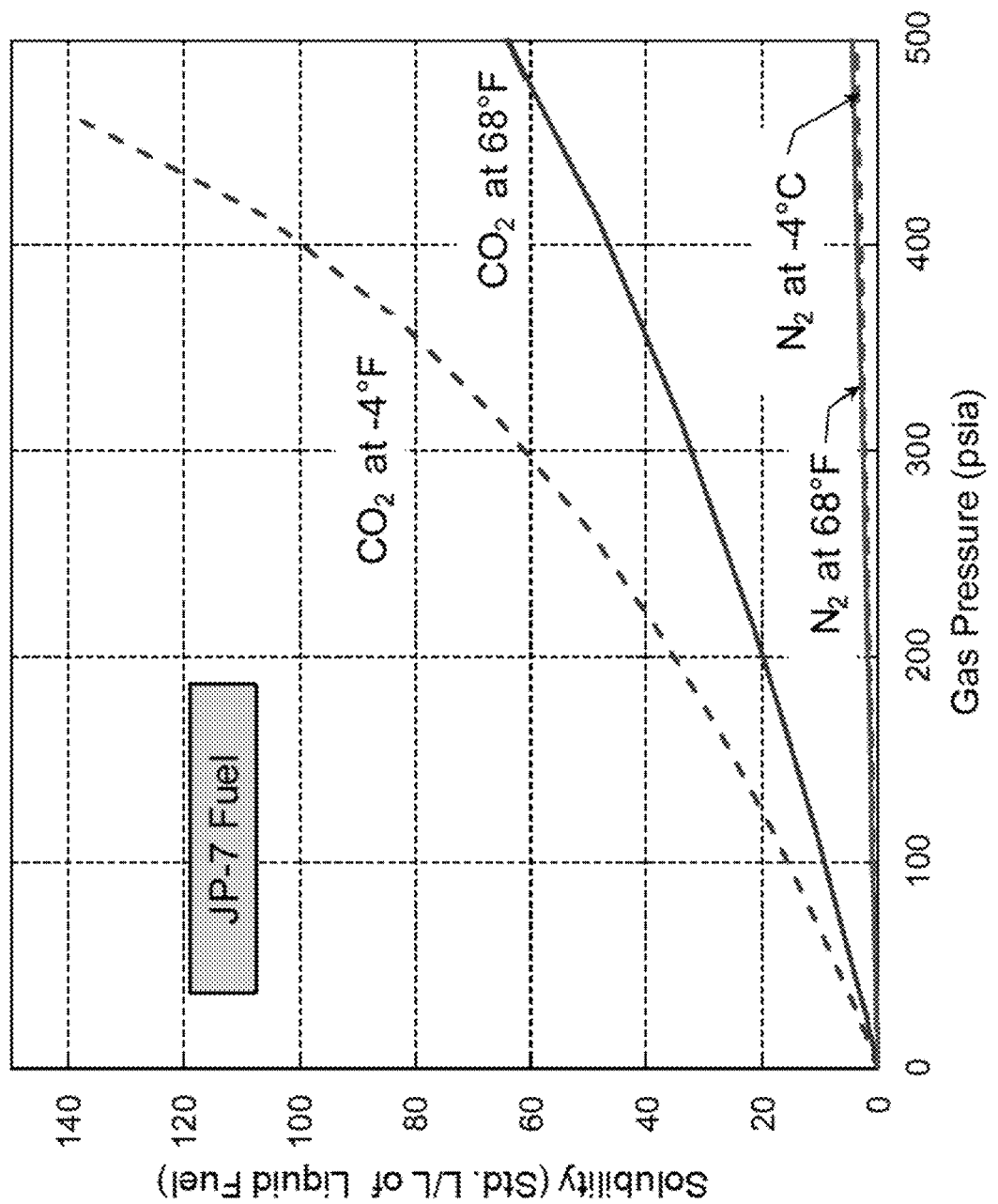
FIG. 12A shows $CO_2$ and $N_2$ solubility in a kerosene-based fuel, JP-7, at two temperatures 68° F. and −4° F. as a function of exposure pressure.

In addition to controlling the $N_2O$ reactor temperature, the addition of $CO_2$ has an additional advantage for barbotage because $CO_2$ is very soluble in fuel and therefore can improve fuel atomization. FIG. 12A shows $CO_2$ and $N_2$ solubility in a kerosene-based fuel, JP-7, at two temperatures 68° F. and −4° F. as a function of exposure pressure. At 68° F. and 300 psig, the solubility of $CO_2$ is 35 SL per liter of fuel and at −4° F., the solubility is 61 SL/L almost two times higher. On the other hand, $N_2$, which is also considered for use as a barbotage gas has solubility of 4 SL/L at 68° F. and 3 SL/L at −4° F. FIG. 11B shows that the high solubility of $CO_2$ also has a strong effect on the viscosity of the fuel. At 300 psig, the increased solubility of $CO_2$ at −4° F. causes the viscosity of the fuel at that temperature to be lower than the viscosity at 68° F. Over all conditions, the viscosity is less with $CO_2$ compared to $N_2$.

The very high solubility of $CO_2$ makes the $N_2O$ decomposition reactor described herein even more useful when used in the barbotage application. Based on the above solubility data, the quantity of $CO_2$ that would be contained in JP-7 or an equivalent fuel (such as Rocket Propellants, RP1 and RP-2) at expected injection pressures and gas to liquid ratios is about 17.1 SL/L at 68° F. and 29.0 SL/L at −4° F. When the fuel reaches the combustor, where the total pressure is much lower than in the injectors, the dissolved $CO_2$ will rapidly come out of solution, forming rapidly growing bubbles inside the fuel droplets, which help break the droplets up and atomize the fuel. It will be appreciated by one of ordinary skill in the art that various jet and rocket fuels are known in the art and can be employed in the reactors of this invention.

Figure 12B:
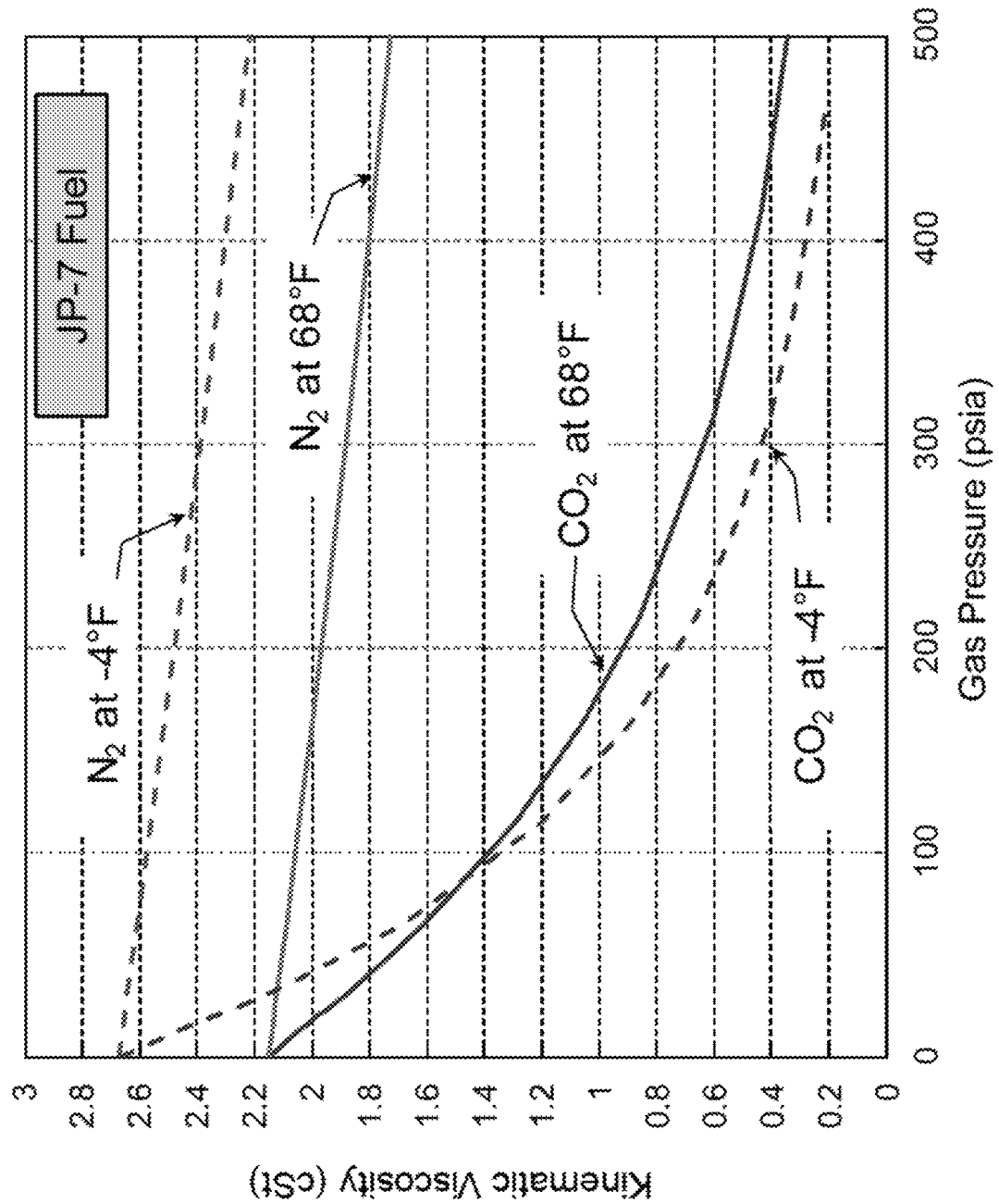
FIG. 12B shows the viscosity of JP-7, at two temperatures 68° F. and −4° F. as a function of $CO_2$ and $N_2$ exposure pressure.
Figure 13B:
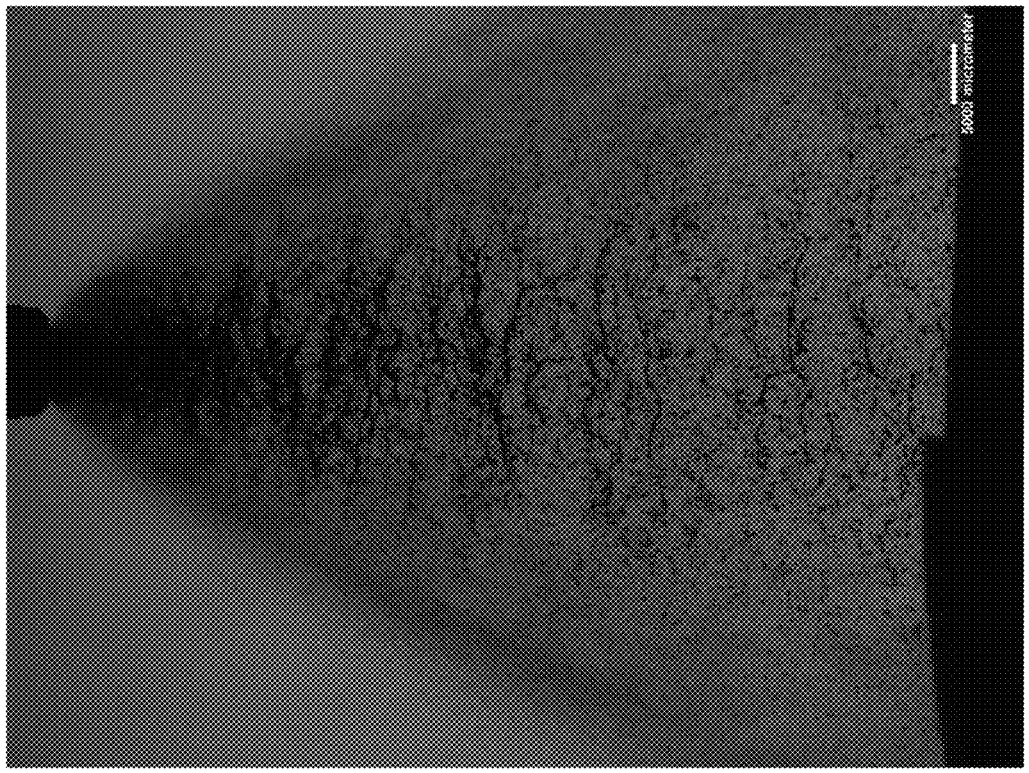
FIGS. 13A and 13B compare the effect of dissolved $CO_2$ on fuel spray.
Figure 13A:
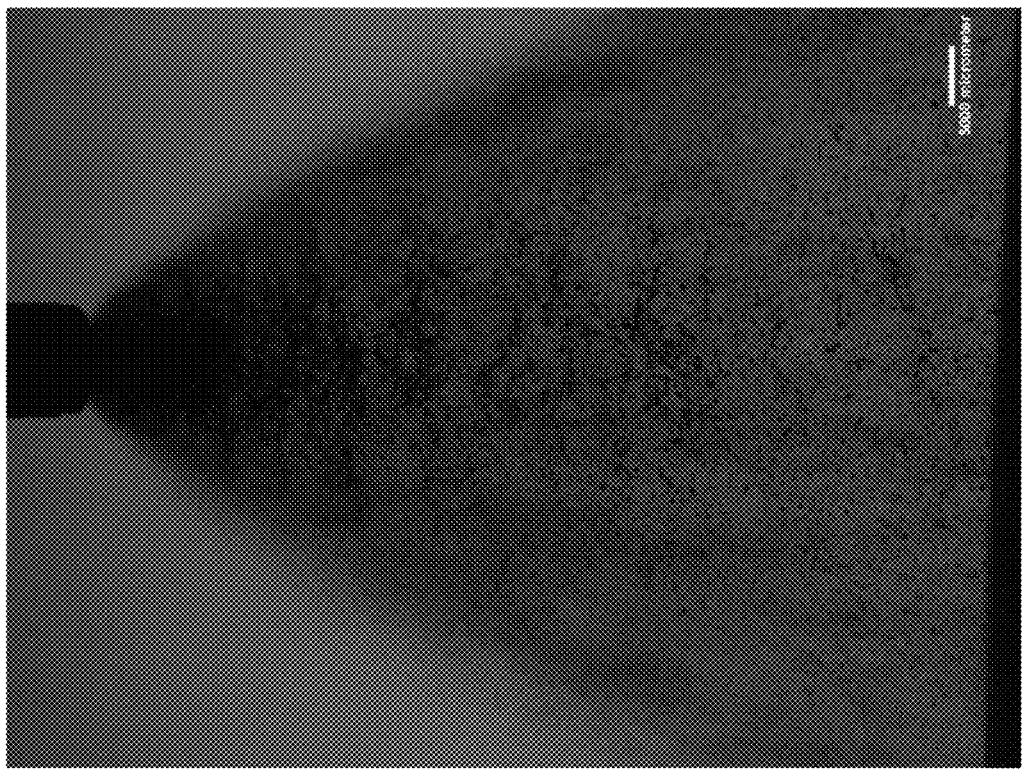

This embodiment has also been demonstrated as shown in FIGS. 13A and 13B. FIG. 13A shows a spray field generated with $CO_2$ saturated RP-2 whereas FIG. 13B shows a spray field generated under identical conditions with neat RP-1. The most notable difference in the images is that there are far fewer fuel ligament structures in FIG. 13A with the $CO_2$ saturated fuel compared to FIG. 13B. Although there are ligaments present in FIG. 13A, they are located closer to the fuel nozzle exit whereas in FIG. 12B (neat RP-1) a larger number of fuel ligaments are observed all the way to the bottom of the image. Another notable difference is that the image in FIG. 13A shows larger dark areas that appear to have a misty or out-of-focus quality compared to FIG. 13B. These dark, out-of-focus areas are caused by droplets that are too small to be resolved by the camera and end up blocking the backlighting from the flash, causing the unique, dark appearance.

In a preferred embodiment, the $CO_2$ containing barbotage gas is particularly useful with fuel that is cold, less than 0° F. because the high-speed vehicle can be capture carried on aircraft for long periods of time at high altitude before it is deployed, causing the fuel to become very cold before the vehicle is activated.

In a preferred embodiment of the invention, the barbotage gas from the reactor will be dispersed into the fuel using a fine frit that allows the $CO_2$ to dissolve rapidly and also leaves small bubbles of $N_2$ and $O_2$, which are much less soluble, dispersed in the fuel. The small bubbles of dispersed $N_2$ and $O_2$ inside the droplets will serve as nucleation sites for $CO_2$ and increase the rate of $CO_2$ gas evolution.

In another preferred embodiment, $N_2O$ also has a high solubility in liquid hydrocarbons that comprise kerosene-based jet fuels. Therefore, any unreacted $N_2O$ that exits the reactor will also dissolve in the fuel like $CO_2$ at high pressure and decrease the fuel viscosity, then it will evolve as bubbles and improve atomization when the pressure decreases in the combustor.

In a preferred embodiment, the concentration of unreacted $N_2O$ in the effluent can be increased by installing a small port on the outer shell of the reactor at the end opposite the inlet port, which draws some fraction of the preheated $N_2O/CO_2$ mixture out of the reactor before it contacts the catalyst. The flow by-passes the catalyst and then is recombined with the main flow before it passes through the choked flow venturi. This modification permits higher concentrations of $N_2O$ to be fed into the fuel injectors while avoiding the hazards of flowing higher $N_2O$ concentrations through the catalyst by decreasing the overall rate of $N_2O$ decomposition.

In exemplary embodiments of the barbotage reactor;

The volume of the inner annulus is 109 cm$^3$ and that of the outer annulus is 34 cm$^3$;

The wall thickness of the outer shell is 0.065 inch;

Mass flow ranges from 5.3 g/s up to 30 g/s;

Surface area on the finned side of the liner is 660 cm$^2$;

Surface area on the inside of the liner is 294 cm$^2$; and

The residence time ranges from 11.5 to 65.3 milliseconds (assuming ideal gas at room temperature and 400 psig).

Ignition Torch Application

The application of the $N_2O$ reactor for a pilot ignition torch requires that temperatures of at least 800° C. be reached in the flow exiting the reactor for the fuel injected into the torch to ignite rapidly. Therefore, the $N_2O$ concentration is higher than in the barbotage application, between 40 and 60%, preferably 50%.

In a preferred embodiment, the gas temperature exiting the reactor must rise to 850° C. rapidly after the $N_2O$ flow is started, preferably in less than 20 seconds after the $N_2O$ flow was started, most preferably in less than 10 seconds.

Because the higher $N_2O$ concentrations generate higher temperatures, the incoming $N_2O$ will reach reaction temperatures more rapidly and therefore the reactor for torch application can be shorter than the reactor for the barbotage application, between 8 and 20 inches. The higher reaction rates at the higher temperatures reduce the catalyst requirement so the catalyst weight and bed length can be reduced to between 4 and 11 grams of catalyst and 3 to 10 inches respectively.

In a preferred embodiment, using less catalyst and a shorter bed length produce more rapid temperature increases at the fluid exit, which is the opposite of conventional steady-state reactor design expectations.

In a preferred embodiment after the temperature of the effluent will remain above 800° C., but below 1100° C. for a period of at least five seconds.

In a preferred embodiment, to achieve sustained performance, the percent $N_2O$ decomposition must be increasing or stable at 100% while $N_2O$ is flowing though the reactor.

In exemplary embodiments of the torch reactor:

The volume of the inner annulus is 68.5 cm$^3$ and the volume of the outer annulus is 33.1 cm$^3$;

The wall thickness of the outer shell is 0.065 in;

Mass flows range from 11.1 to 30 g/s;

Surface area on the outside of the liner is 210.4 cm$^2$;

Surface area on the inside of the liner is 182.6 cm$^2$; and

Residence times range from 8.2 to 22 milliseconds (assuming ideal gas at room temperature and 400 psig).

Either $O_2$ produced by the decomposition of $N_2O$ or unreacted $N_2O$ can be used as the oxidant for the torch and therefore the percent $N_2O$ decomposition achieve during the test only affects the performance of the device through affecting the temperature of the flow exiting the reactor, not the ability of the mixture to oxidize the fuel entering the pilot torch.

All references cited herein are hereby incorporated by reference to the extent not inconsistent with the disclosure herewith.

Although the description herein contains many specifics, these should not be construed as limiting the scope of the invention but as merely providing illustrations of some of the presently preferred embodiments of the invention. Thus, the scope of the invention should be determined by the appended claims and their equivalents, rather than by the examples given. When a Markush group or other grouping is used herein, all individual members of the group and all combinations and sub-combinations possible of the group are intended to be individually included in the disclosure.

Every combination of components described or exemplified can be used to make and use the devices described herein unless otherwise stated. One of ordinary skill in the art will appreciate that methods and device elements, other than those specifically exemplified can be employed to 10 make and use the devices as described herein without resort to undue experimentation. All art known functional equivalents, of any such methods, and device elements, are intended to be included in this invention. Whenever a range is given in the specification, for example, a temperature range, a time range, a range of pulse rates, a range of pressure or a composition range, all intermediate ranges and subranges, as well as all individual values included in the 15 ranges given are intended to be included in the disclosure.

As used herein, "comprising" is synonymous with "including," "containing,", "composed of", or "characterized by," and is inclusive or open-ended and does not exclude additional, unrecited elements or method steps. As used herein, "consisting of" does not exclude any element, step, 20 or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the 25 recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general, the terms and phrases used herein have their art-recognized meaning, which can be found by reference to standard texts, journal references and contexts known to those skilled in the art. The preceding definitions are provided to clarify their specific use in the context of the invention. The examples provided herein are not intended to be limiting.

We claim:

1. A catalytic $N_2O$ decomposition process to generate an effluent containing oxygen which comprises:
    introducing a $N_2O$ feed mixture into a decomposition reactor to contact a $N_2O$ decomposition catalyst;
    preheating the $N_2O$ feed mixture introduced into the reactor prior to contact of the $N_2O$ feed mixture with the $N_2O$ decomposition catalyst; and
    contacting the $N_2O$ decomposition catalyst with the preheated $N_2O$ feed mixture to generate the effluent containing oxygen;
    where the mass flow of the $N_2O$ feed mixture per minute introduced into and flowing through the $N_2O$ decomposition catalyst equals or exceeds the weight of the decomposition reactor, thereby requiring control of reaction temperature; and
    where the $N_2O$ feed mixture is diluted with $CO_2$ to control reaction temperature to prevent exceeding maximum operating temperature of the reactor.

2. The process of claim 1, where the reactor is operated in pulsed mode, wherein the $N_2O$ feed mixture flow is stopped before the reactor temperature exceeds maximum operating temperature of the reactor.

3. The process of claim 1, further comprising monitoring the temperature of the heated effluent containing oxygen generated in the reactor and stopping the flow of $N_2O$ feed mixture into the reactor when the temperature of the effluent exceeds a selected maximum operating temperature of the reactor.

4. The process of claim 3, wherein the maximum operating temperature is controlled to a temperature between 492° C. and 1263° C.

5. The process of claim 1, wherein the heated effluent containing oxygen reaches a temperature between 800° C. and 1200° C. in less than 20 seconds and maintains that temperature range for up to 20 seconds.

6. The process of claim 1, wherein the heated effluent containing oxygen reaches a temperature between 400° C. and 800° C. and maintains that temperature range for up to two minutes.

7. The process of claim 1, wherein the maximum operating temperature is controlled to a temperature between 492° C. and 1263° C.

8. The process of claim 1, wherein the $N_2O$ feed mixture is adjusted to comprise 40 to 75 mole % $CO_2$.

9. The process of claim 1, wherein the $N_2O$ decomposition catalyst comprises rhodium oxide, ruthenium oxide, zirconium oxide, silica oxide, strontium hexaaluminate or lanthanum hexaaluminate.

10. A catalytic $N_2O$ decomposition reactor for generating a heated effluent comprising oxygen, which comprises an inner and an outer annulus in flow communication and a reactor exit fitting in the inner annulus, wherein a $N_2O$ feed mixture introduced into the outer annulus passes into the inner annulus and the heated effluent leaves the reactor through the exit fitting in the inner annulus, wherein the inner annulus comprises a $N_2O$ decomposition catalyst, and wherein the $N_2O$ feed mixture is preheated to a selected temperature in the outer annulus prior to contacting the $N_2O$ decomposition catalyst in the inner annulus, wherein:
    a. at least a portion of the walls forming the outer annulus are ribbed, finned or wrapped with wire,
    b. the reactor further comprises a choke flow venturi valve at the exit fitting in the inner annulus to maintain pressure in the reactor and wherein the heated effluent containing oxygen exits the reactor through the choked flow venturi valve; and/or
    c. the reactor further comprises a flow controller for adjusting the $CO_2$ content in the $N_2O$ feed mixture and at least one thermocouple for monitoring temperature of the heated effluent containing oxygen exiting the reactor.

11. The reactor of claim 10, which further comprises a heater in thermal contact with the inner annulus and wherein the outer annulus is in thermal contact with the inner annulus and heat produced in the inner annulus by $N_2O$ decomposition reaction and heat generated by the heater function to preheat the feed in the outer annulus.

12. The reactor of claim 10, wherein at least a portion of the walls of the outer annulus are ribbed.

13. The reactor of claim 12, which further comprises a choked flow venturi valve at the exit fitting in the inner annulus to maintain pressure in the reactor and wherein the heated effluent containing oxygen exits the reactor through the choked flow venturi valve.

14. The reactor of claim 13, which further comprises a frit at the exit of the choked flow venturi valve through which the heated effluent containing oxygen is dispersed on exiting the reactor.

15. The reactor of claim 10, which further comprises a choked flow venturi valve at the exit fitting in the inner annulus to maintain pressure in the reactor and wherein the heated effluent containing oxygen exits the reactor through the choked flow venturi valve.

16. The reactor of claim 10, wherein the reactor further comprises an outer shell in which the outer annulus and the inner annulus are formed by insertion of a liner into the outer shell and wherein an outer surface of the liner is finned, ribbed or wrapped with wire.

17. The reactor of claim 16, which further comprises a choked flow venturi valve at the exit fitting in the inner annulus to maintain pressure in the reactor and wherein the heated effluent containing oxygen exits the reactor through the choked flow venturi valve.

18. The reactor of claim 10, which further comprises a flow controller for adjusting the $CO_2$ content in the $N_2O$ feed mixture and at least one thermocouple for monitoring temperature of the heated effluent containing oxygen exiting the reactor, wherein the $CO_2$ content in the $N_2O$ feed mixture is adjusted to control reaction temperature to prevent exceeding maximum operating temperature of the reactor.

19. The reactor of claim 18, which further comprises a choked flow venturi valve at the exit fitting in the inner annulus to maintain pressure in the reactor and wherein the heated effluent containing oxygen exits the reactor through the choked flow venturi valve.

20. The reactor of claim 18, wherein at least a portion of the walls forming the outer annulus are ribbed, finned or wrapped with wire.

\* \* \* \* \*